US012242517B2

(12) United States Patent
Behan

(10) Patent No.: US 12,242,517 B2
(45) Date of Patent: Mar. 4, 2025

(54) INVENTIVE SECURE AND INTERACTIVE PLATFORM FOR REAL-TIME ANALYSIS AND PRESENTATION OF USER OPINIONS AND CHOICES

(71) Applicant: Michael John Behan, Saint Augustine, FL (US)

(72) Inventor: Michael John Behan, Saint Augustine, FL (US)

(73) Assignee: Michael John Behan, Saint Augustine, FL (US)

( * ) Notice: Subject to any disclaimer, the term of this patent is extended or adjusted under 35 U.S.C. 154(b) by 0 days.

(21) Appl. No.: 18/219,919

(22) Filed: Jul. 10, 2023

(65) Prior Publication Data

US 2025/0021584 A1   Jan. 16, 2025

(51) Int. Cl.
*G06F 16/28* (2019.01)
*G06F 3/0482* (2013.01)
*G06F 16/248* (2019.01)

(52) U.S. Cl.
CPC .......... *G06F 16/287* (2019.01); *G06F 3/0482* (2013.01); *G06F 16/248* (2019.01)

(58) Field of Classification Search
CPC ............. G06F 16/248; G06F 16/212; G06F 16/24573; G06F 16/24575; G06F 16/9577; G06Q 30/0255; G06Q 30/0263
See application file for complete search history.

(56) References Cited

U.S. PATENT DOCUMENTS

| | | | |
|---|---|---|---|
| 2013/0036459 A1* | 2/2013 | Liberman | H04L 9/0866 726/6 |
| 2016/0283076 A1* | 9/2016 | Armstrong | G06F 3/0485 707/737 |
| 2016/0299672 A1* | 10/2016 | Lindenberg | H04L 65/403 707/999.003 |
| 2017/0060874 A1* | 3/2017 | Sciarrillo | G06Q 50/01 707/999.003 |
| 2018/0034756 A1* | 2/2018 | Allen | H04L 51/04 707/999.003 |
| 2018/0375812 A1* | 12/2018 | Mao | G06Q 50/01 707/999.003 |
| 2019/0339832 A1* | 11/2019 | D'Angelo | G06F 3/0484 707/737 |
| 2020/0036783 A1* | 1/2020 | Bourassa | G06F 16/90335 726/6 |

(Continued)

*Primary Examiner* — Yuk Ting Choi

(57) ABSTRACT

An interactive platform for researching and analyzing a set of topics to elicit opinions and choices via a user device. The interactive platform creates one user profile based on a unique identification of a first user. The interactive platform presents the set of topics to the first user and receives selections of a set of responses or choices corresponding to the set of topics that are processed, segregated, and stored in real time. Furthermore, the interactive platform enables reception of a user response for the set of topics based on own analysis of the first user. Moreover, the selections are limited to a daily number of opinions. The set of responses may be quantified and presented to a plurality of users registered on the interactive platform. Furthermore, the interactive platform enables segregation or categorization of the set of responses based on, for example, age, geographical location, and other categories.

16 Claims, 11 Drawing Sheets

(56) References Cited

U.S. PATENT DOCUMENTS

| | | | |
|---|---|---|---|
| 2020/0097726 A1* | 3/2020 | Gurule | H04N 21/84 726/6 |
| 2022/0230194 A1* | 7/2022 | Reynolds | G10L 15/26 726/6 |

* cited by examiner

INVENTIVE SECURE AND INTERACTIVE PLATFORM FOR REAL-TIME ANALYSIS AND PRESENTATION OF USER OPINIONS AND CHOICES

TECHNICAL FIELD

The present disclosure generally relates to an interactive digital platform, and particularly relates to interactive platforms for providing search functionalities, and methods of usage of the interactive platforms.

BACKGROUND

Generally, in an information-driven society, there may be a constant need for efficient platforms that may enable users to access, research, and engage with a wide variety of subject matters. Nowadays, a wide range of information regarding the subject matters may be available digitally that may be accessed by the users. Typically, conventional digital platforms, such as web portals may be utilized to provide information regarding the various subject matters. Such web portals may be accessed by the users to obtain the information regarding the various subject matters.

Typically, the conventional web portals may be dedicated to specific categories of content or the information. For example, a website may cater to providing the content regarding current affairs. In another example, a website may provide the blogs and articles regarding different topics. In most cases, accessing the websites providing only the specific content may require registration of the user on the website. In such a case, there may be a need to register on multiple websites to access different kinds of content that may be a cumbersome task for the user. Furthermore, accessing the provided content on the multiple websites may require a paid subscription by the user. In such a scenario, accessing the different kinds of contents may be cost ineffective for the user. Moreover, the content provided on the conventional web portals may be based on data provided by various users, out of which some of the users may endorse false information for personal benefits. In addition to that, bots may be deployed by malicious entities to spread the false information or to promote particular stories or information on the conventional web portals. In such cases, the provided information on the conventional web portals may be inaccurate and unreliable.

Therefore, there is a need for an improved platform for providing accurate, reliable, and cost effective information to the users.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

An interactive platform, a method, a computer programmable product are provided for facilitating accessing, retrieval, presenting data in effective and presentable manner.

According to one embodiment, an interactive platform to display a set of topics is provided. The interactive platform comprises at least one non-transitory memory configured to store computer executable instructions, and at least one processor configured to execute the computer executable instructions to cause to display a set of topics on a user interaction pane of a user interface (UI) associated with the interactive platform. The set of topics are related to a plurality of categories. The at least one processor further configured to receive selection of one or more topics from the displayed set of topics from a first user via the user interaction pane. The selection of the one or more topics is based on a preference of the first user. The at least one processor further configured to provide a set of responses for at least one of the selected one or more topics. The provided set of responses for at least one of the selected one or more topics is generated based on at least one of: data associated with respective topic of the set of topics, or a plurality of inputs for the respective topic received from a plurality of users of the interactive platform, or a combination thereof. The at least one processor further configured to receive selection of at least one response of the set of responses from the first user. The selected at least one response indicates a choice of the first user for the respective topic of the selected one or more topics. The at least one processor further configured to store the selected at least one response and the selected one or more topics in a database associated with the interactive platform. The stored at least one response and the one or more topics are utilized to provide insights for the one or more topics to the plurality of users of the interactive platform.

In additional system embodiments, the at least one processor is further configured to receive profile information of the first user via the UI. The received profile information comprises at least one unique identification (ID) of the first user. The at least one processor is further configured to verify the received profile information based on at least the unique ID of the first user. The verification is performed to ensure that the unique ID of the first user is different from unique IDs of the plurality of users registered on the interactive platform. The at least one processor is further configured to create a user profile for the first user based on the verified profile information.

In additional system embodiments, the unique ID of the first user comprises at least one of: a social security number of the user, a driving license ID, a passport number, and an individual taxpayer identification (ITIN) number of the first user.

In additional system embodiments, the received profile information further comprises biometric information of the first user, and wherein the at least one processor is configured to verify the received profile information based on the biometric information of the first user.

In additional system embodiments, the at least one processor is further configured to receive a search query via a search UI element. The search UI element is utilized by the first user to conduct searches associated with the plurality of categories on the interactive platform. The at least one processor is further configured provide one or more search results corresponding to the received search query. The one or more search results comprises at least one of: textual information, visual information, audio information, and an audio-visual information associated with the received search query.

In additional system embodiments, the at least one processor is further configured to receive the provided one or more search results corresponding to the received search query from one of: the database and third-party service providers associated with a plurality of platforms.

In additional system embodiments, the at least one processor is further configured to provide a navigation pane on the UI. The navigation pane comprises first information associated with a plurality of subjects in the plurality of categories. The at least one processor is further configured to receive navigational input from the first user. The navigational input from the first user is associated with engagement of the first user with the first information on the interactive platform.

In additional system embodiments, the at least one processor is further configured to generate the displayed set of topics based at least one of: second information associated with the set of topics received from the third-party service providers associated with the plurality of platforms, and the navigational input received from the plurality of users of the interactive platform.

In additional system embodiments, the at least one processor is further configured to process the data associated with respective topic of the set of topics. The data is included in the second information associated with the set of topics. The at least one processor is further configured to process the plurality of inputs for the respective topic of the set of topics received from the plurality of users. The plurality of inputs is included in the navigational input received from the plurality of users. The at least one processor is further configured to generate the provided set of responses based on the processed data associated with respective topic, and the plurality of inputs for the respective topic of the set of topics.

In additional system embodiments, the at least one processor is further configured to utilize one or more artificial intelligence (AI) models to process the data associated with respective topic of the set of topics and the plurality of inputs for the respective topic of the set of topics.

In additional system embodiments, the at least one processor is further configured to receive a user response as an input from the first user, for a topic of the selected one or more topics. The at least one processor is further configured to process the user response to determine information included in the user response. The at least one processor is further configured to generate an additional response in the set of responses, based on the processed user response. The at least one processor is further configured to store the generated additional response in the database.

In additional system embodiments, the selected at least one response comprises at least one primary response and at least one secondary response. The primary response and the secondary response indicates the choice of the first user related to the selected one or more topics in a chronological order.

In additional system embodiments, the at least one processor is further configured to control at least one of: the user interaction pane of the UI, and a navigational pane of the UI, based on one or more algorithms. The control comprises formatting data associated with the plurality of users and the plurality of categories based on a format selected by the first user.

In additional system embodiments, the format selected by the first user is based on at least one of: a geographical region wise categorization, a gender wise categorization, a race wise categorization, and an age wise categorization.

In additional system embodiments, the at least one processor is further configured to the format selected by the first user is further based on selection of a visual graphic from a plurality of visual graphics.

According to another embodiment, a method for displaying a set of topic is provided. The method comprising causing to display a set of topics on a user interaction pane of a user interface (UI) associated with the interactive platform, wherein the set of topics are related to a plurality of categories. The method further comprising receiving selection of one or more topics from the set of topics from a first user via the user interaction pane. The selection of the one or more topics is based on a preference of the first user. The method further comprising providing a set of responses for at least one of the selected one or more topics. The provided set of responses for at least one of the selected one or more topics is generated based on at least one of: data associated with respective topic of the set of topics, or a plurality of inputs for the respective topic received from a plurality of users of the interactive platform, or a combination thereof. The method further comprising receiving selection of at least one response of the set of responses from the first user. The selected at least one response indicates a choice of the first user for the respective topic of the selected one or more topics. The method further comprising storing the selected at least one response and the selected one or more topics in a database associated with the interactive platform. The stored at least one response and the one or more topics are utilized to provide insights for the one or more topics to the plurality of users of the interactive platform.

In additional method embodiments, the method further comprises receiving profile information of the first user via the UI. The received profile information comprises at least one unique identification (ID) of the first user. The method further comprising verifying the received profile information based on at least the unique ID of the first user. The verification is performed to ensure that the unique ID of the first user is different from unique IDs of the plurality of users registered on the interactive platform. The method further comprising creating a user profile for the first user based on the verified profile information.

In additional method embodiments, the unique ID of the first user comprises at least one of: a social security number of the user, a driving license ID, a passport number, and an individual taxpayer identification (ITIN) number of the first user.

In additional method embodiments, the method further comprising receiving a search query via a search UI element, wherein the search UI element is utilized by the first user to conduct searches associated with the plurality of categories on the interactive platform. The method further comprising providing one or more search results corresponding to the received search query. The one or more search results comprises at least one of: textual information, visual information, audio information, and audio-visual information associated with the received search query.

According to yet another embodiment, a computer programmable product comprising a non-transitory computer readable medium having stored thereon computer executable instruction which when executed by one or more processors, cause the one or more processors to carry out operations for hiring users, the operations comprising causing to display a set of topics on a user interaction pane of a user interface (UI) associated with the interactive platform. The set of topics are related to a plurality of categories. The operations further comprising receiving selection of one or more topics from the set of topics from a first user via the user interaction pane, wherein the selection of the one or more topics is based on a preference of the first user. The operations further comprising providing a set of responses for at least one of the selected one or more topics. The provided set of responses for at least one of the selected one or more topics is generated based on at least one of: data associated with respective topic of the set of topics, and a plurality of inputs for the respective topic received from a plurality of users of the interactive platform. The operations further comprising receiving selection of at least one response of the set of responses from the first user. The selected at least one response indicates a choice of the first user for the respective topic of the selected one or more topics. The operations further comprising storing the selected at least one response and the selected one or more topics in a database associated with the interactive platform. The stored at least one response and the selected one or more topics are utilized to provide insights for the one or more topics to the plurality of users of the interactive platform.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
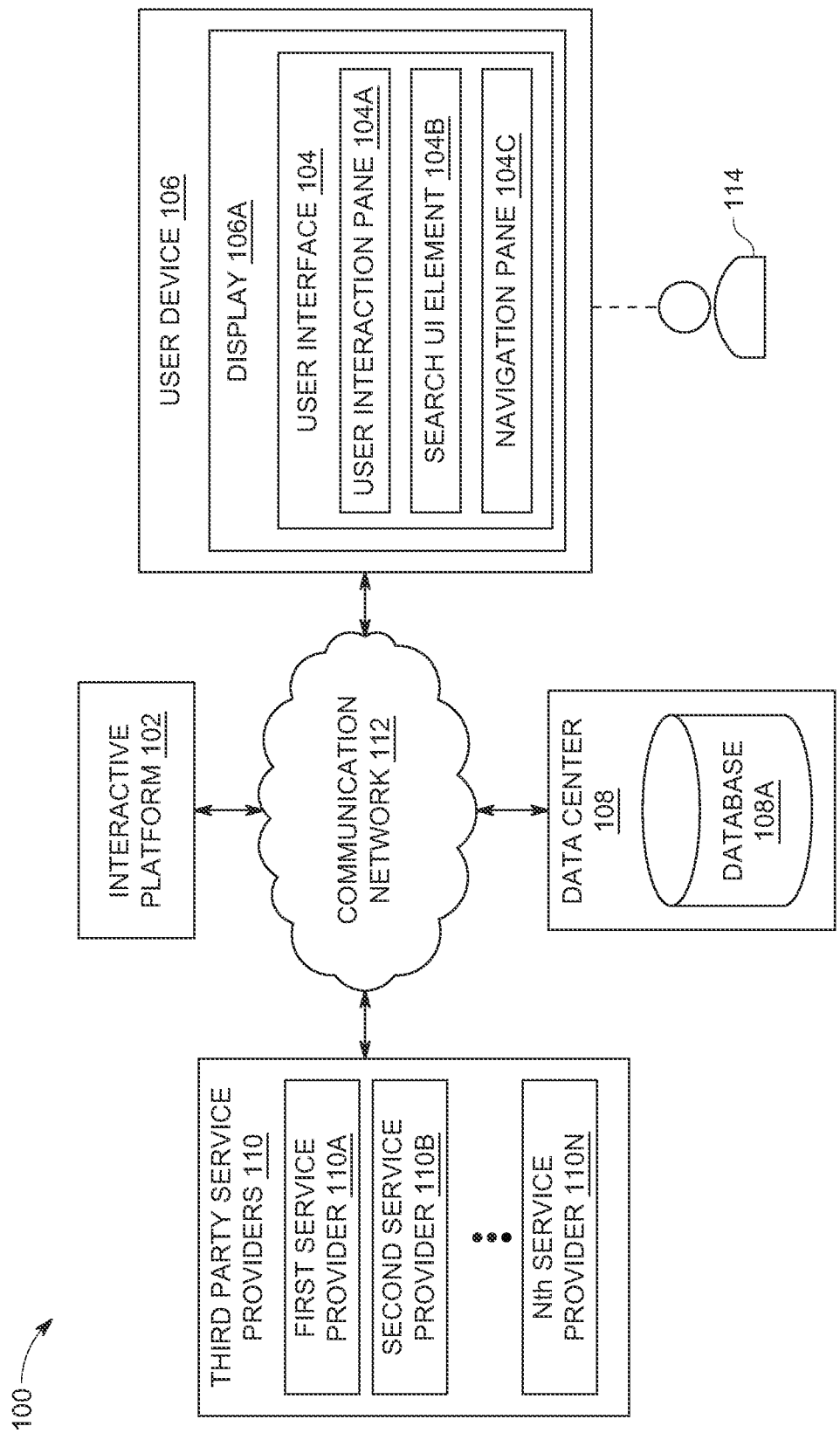
Figure 2:
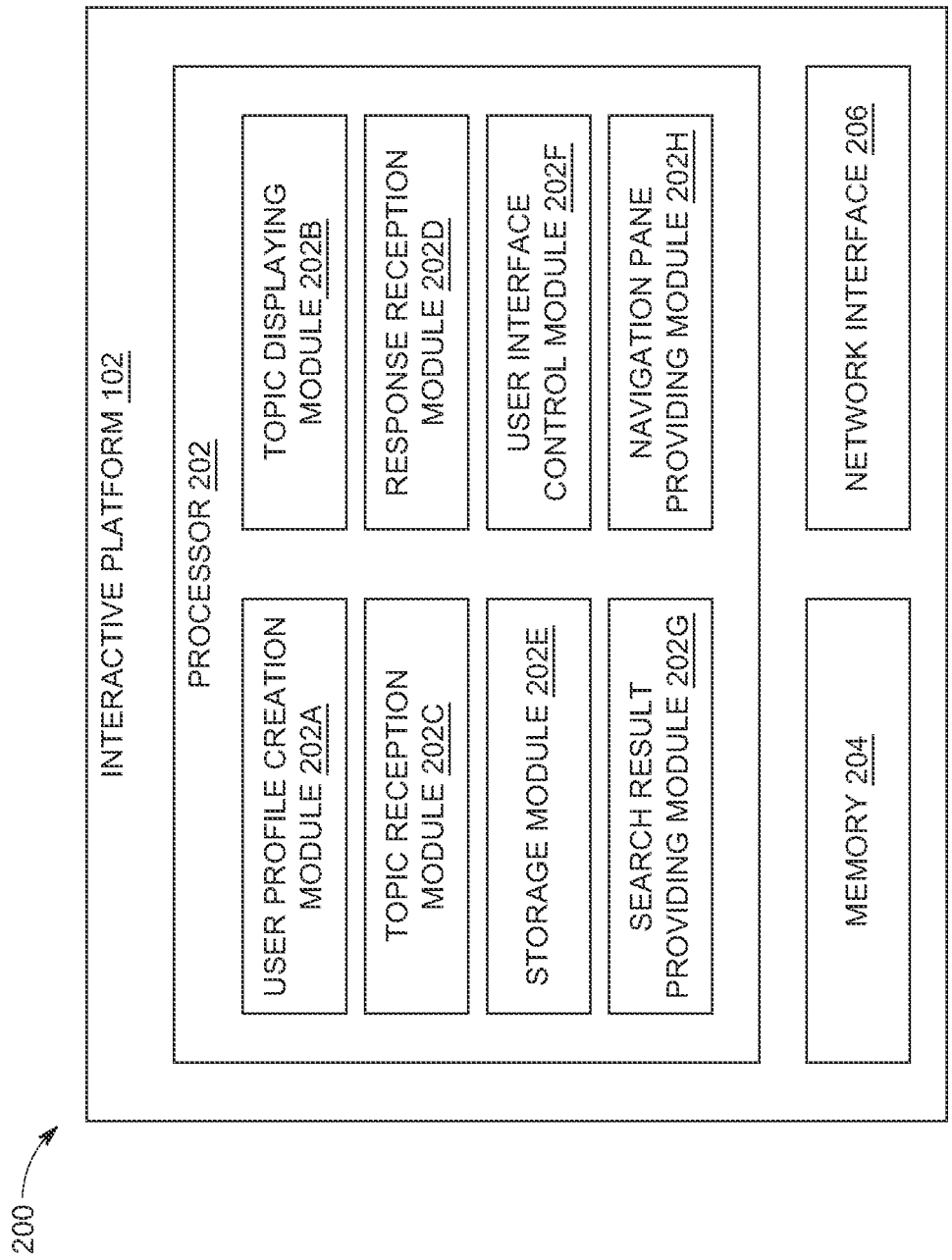
Figure 3:
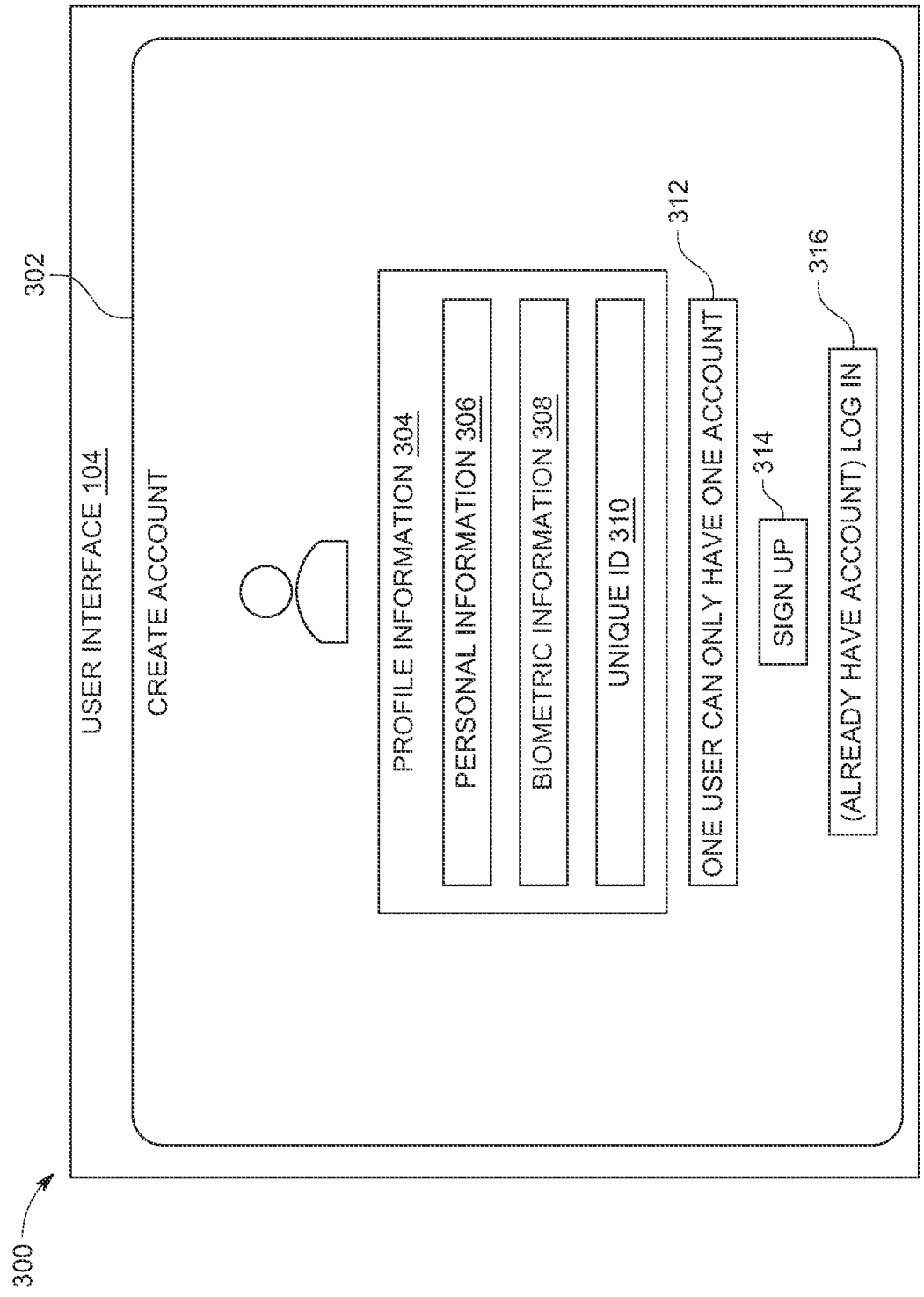
Figure 4A:
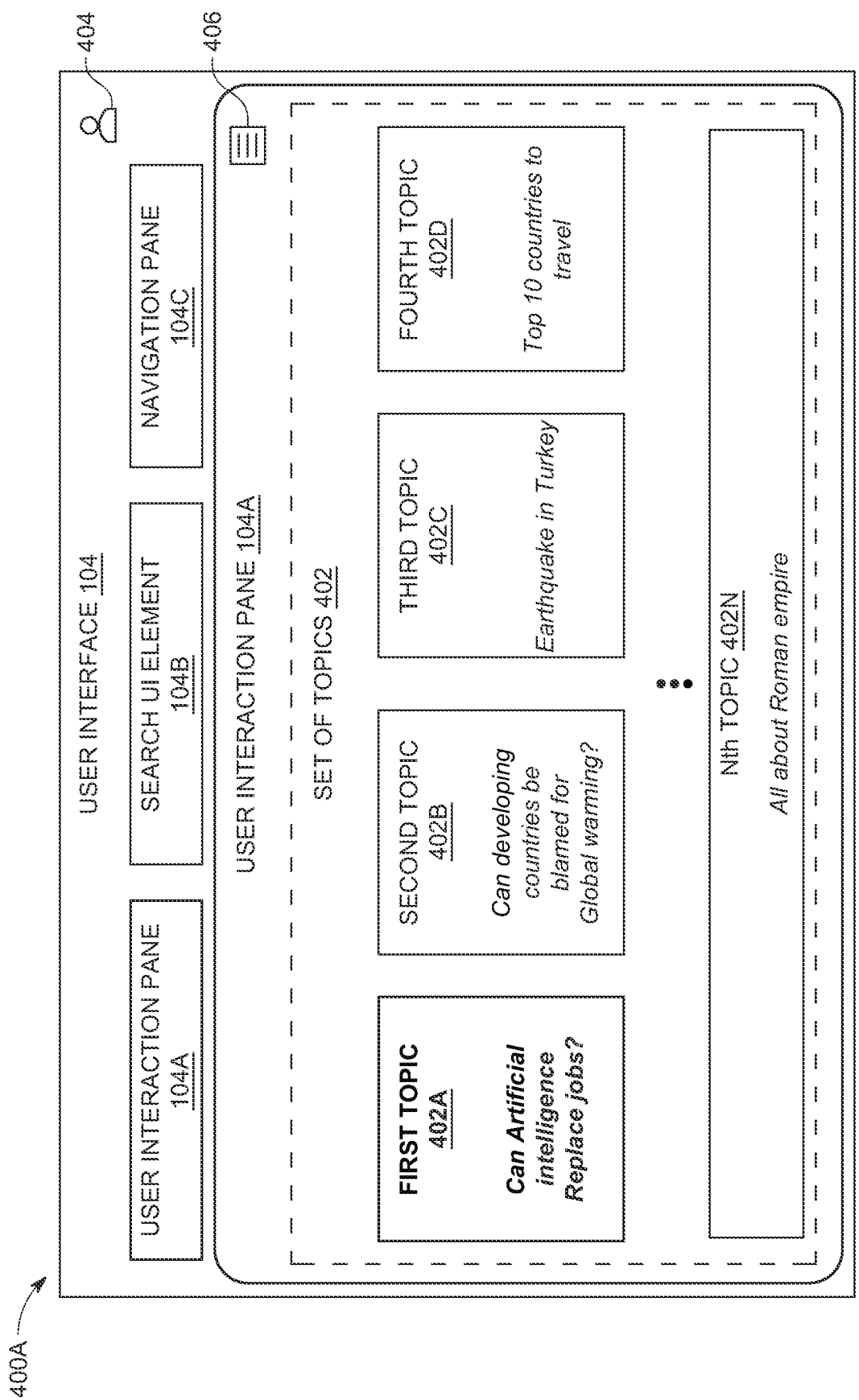
Figure 4B:
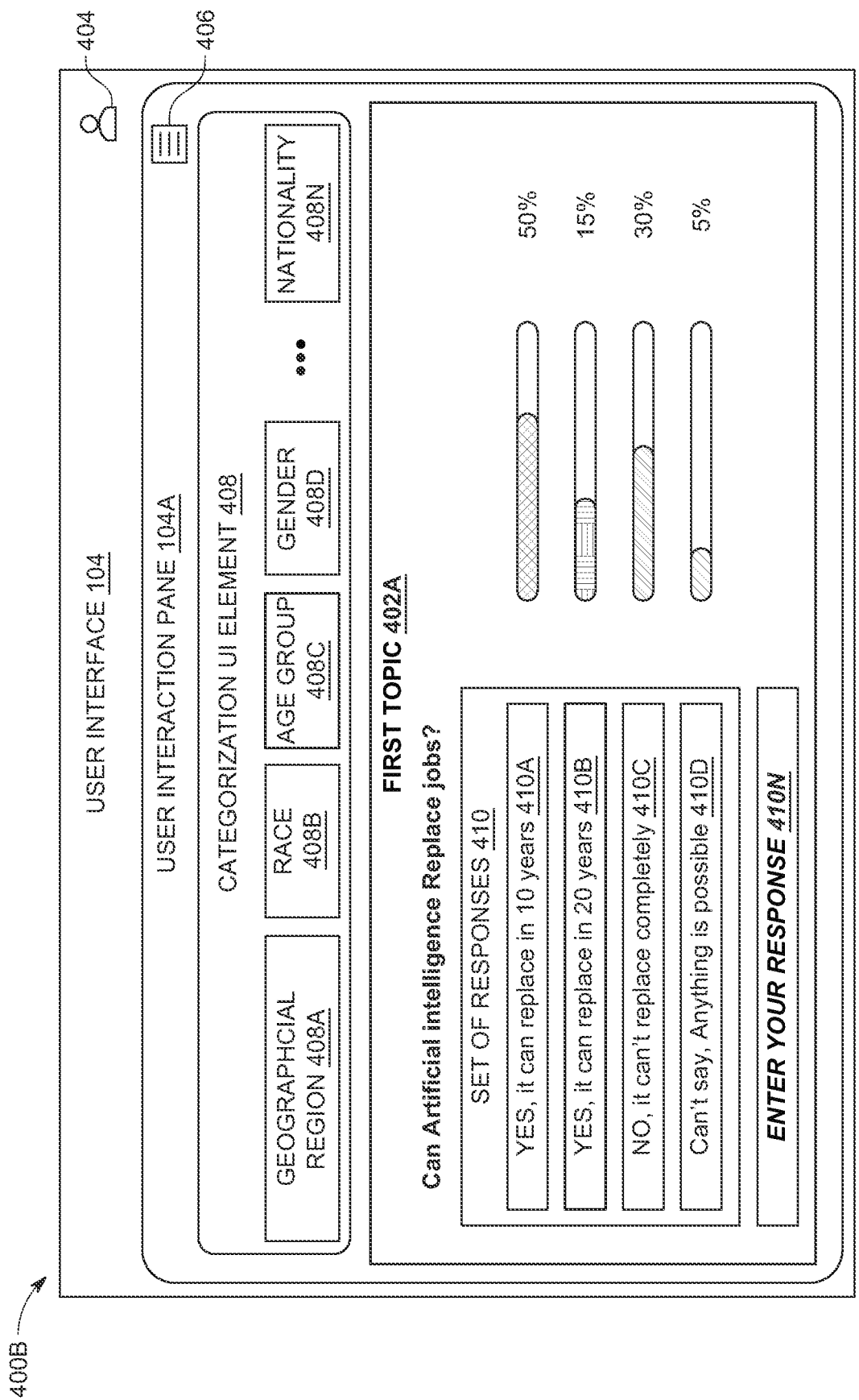
Figure 4C:
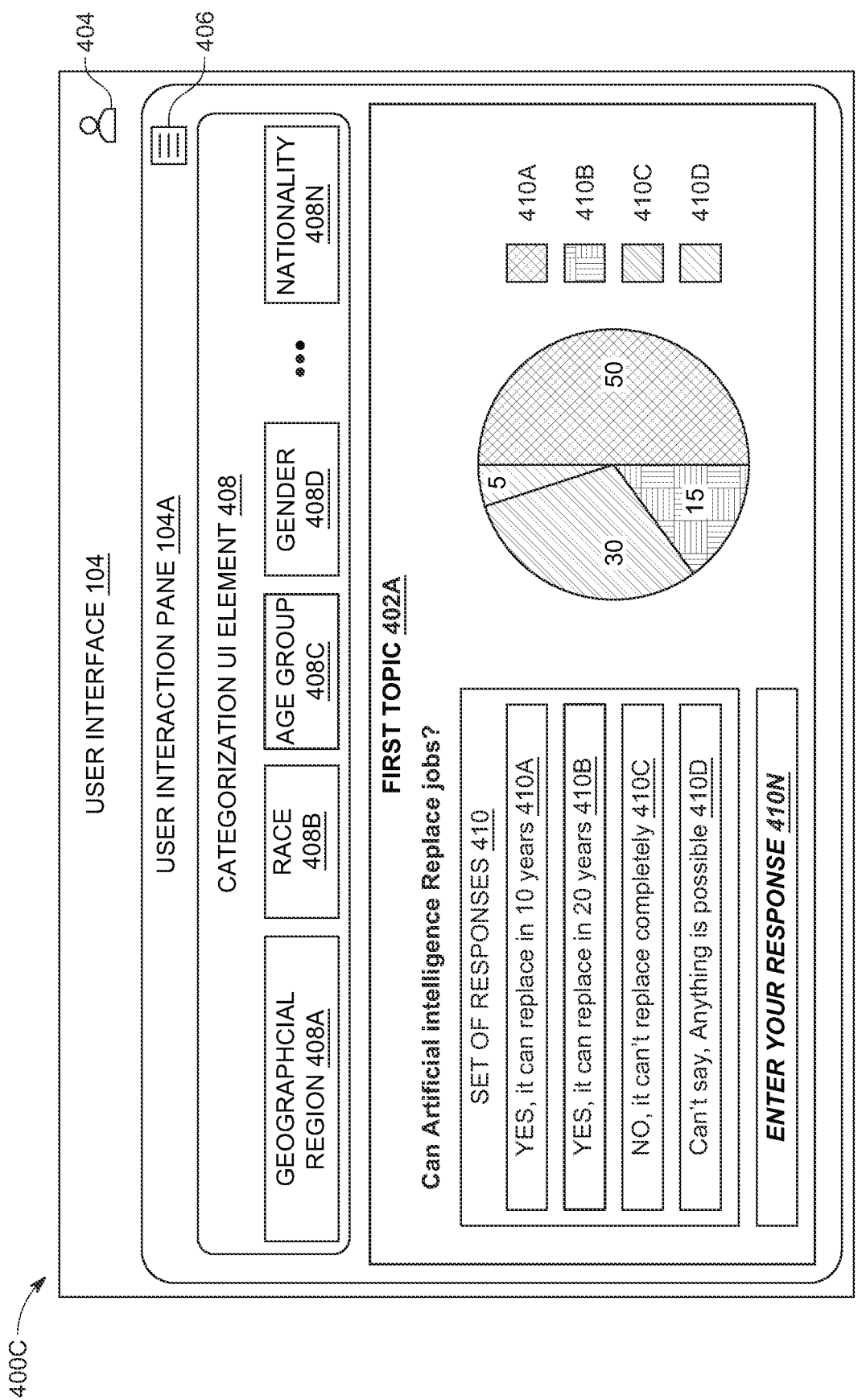
Figure 4D:
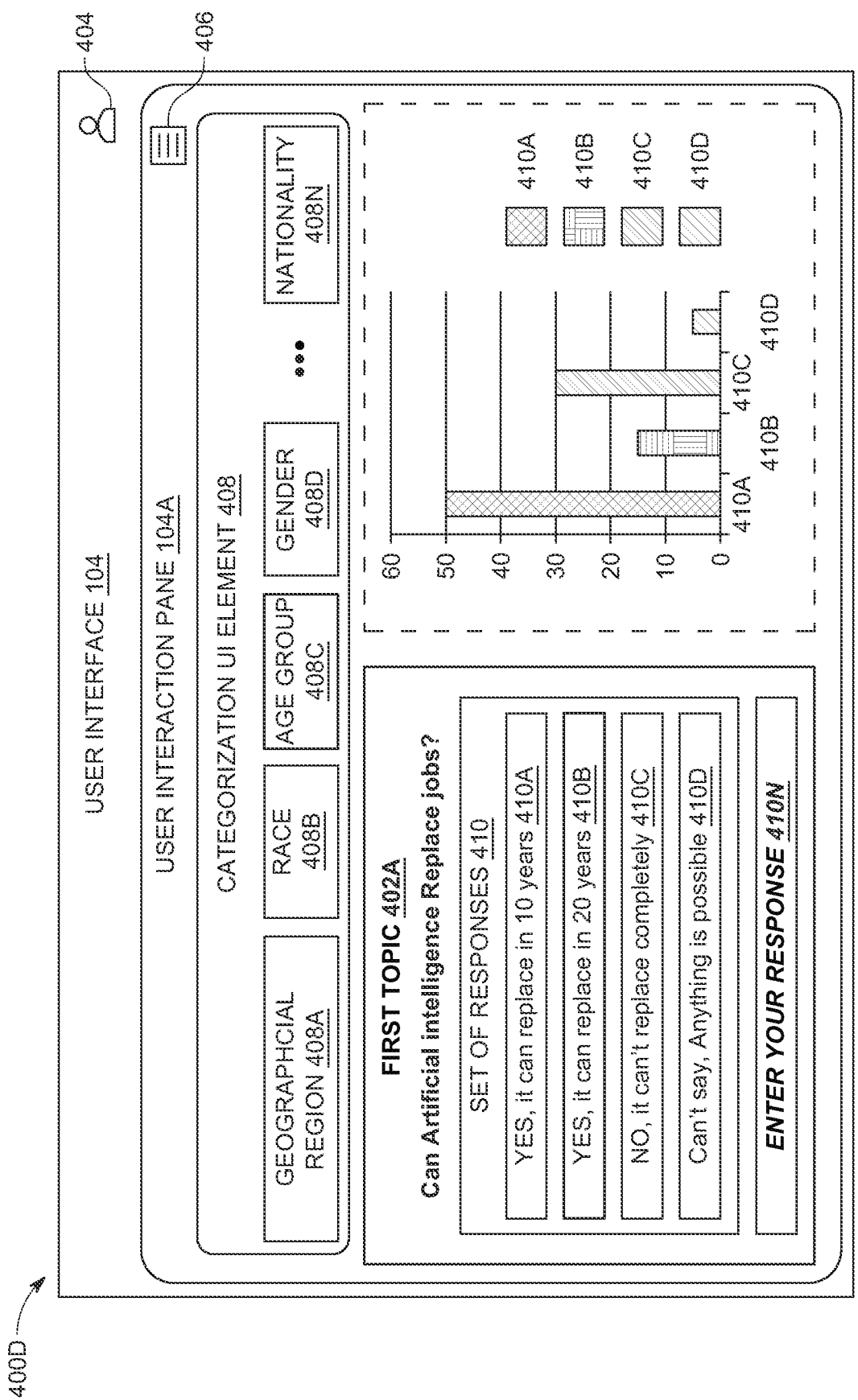
Figure 4E:
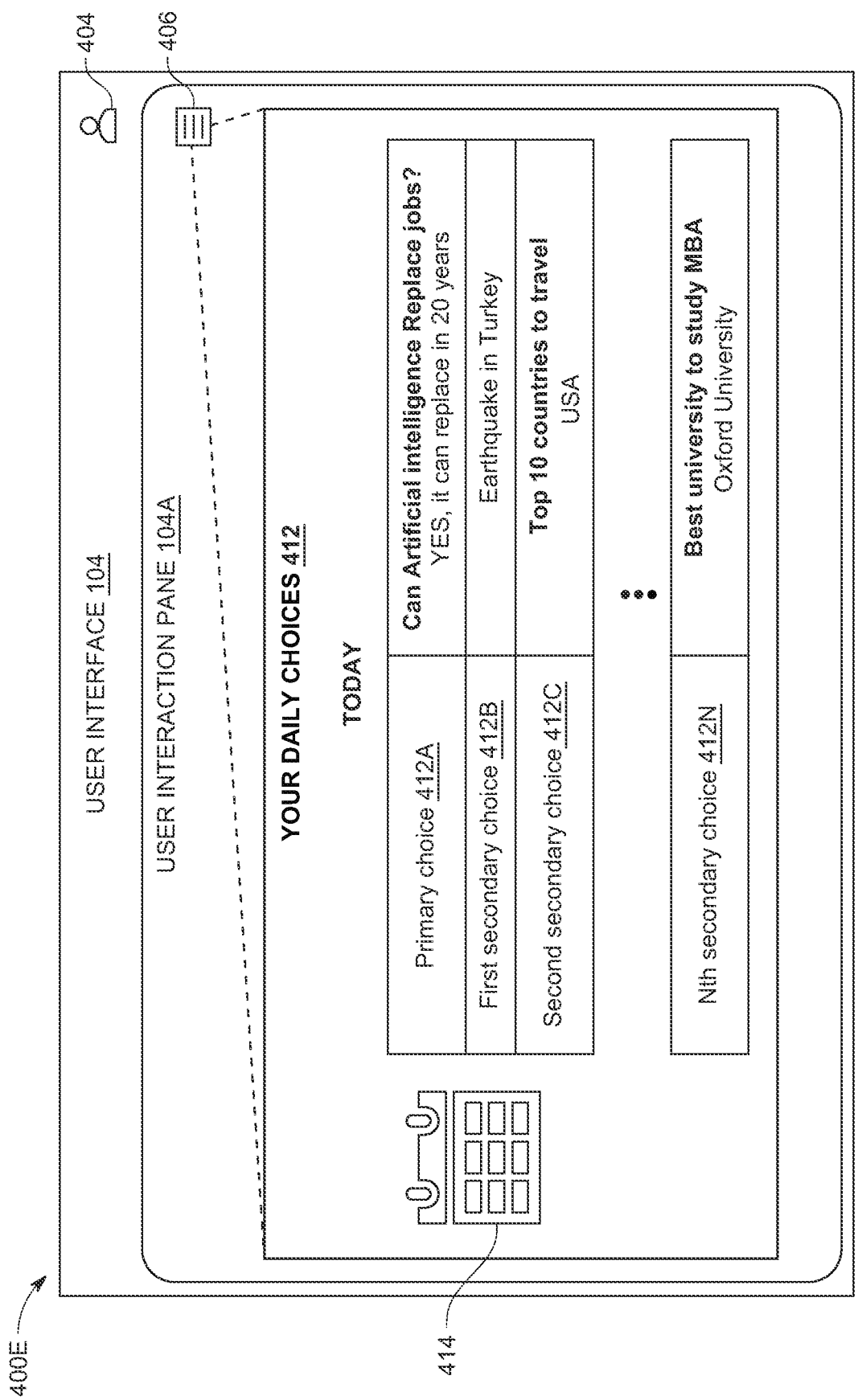
Figure 4F:
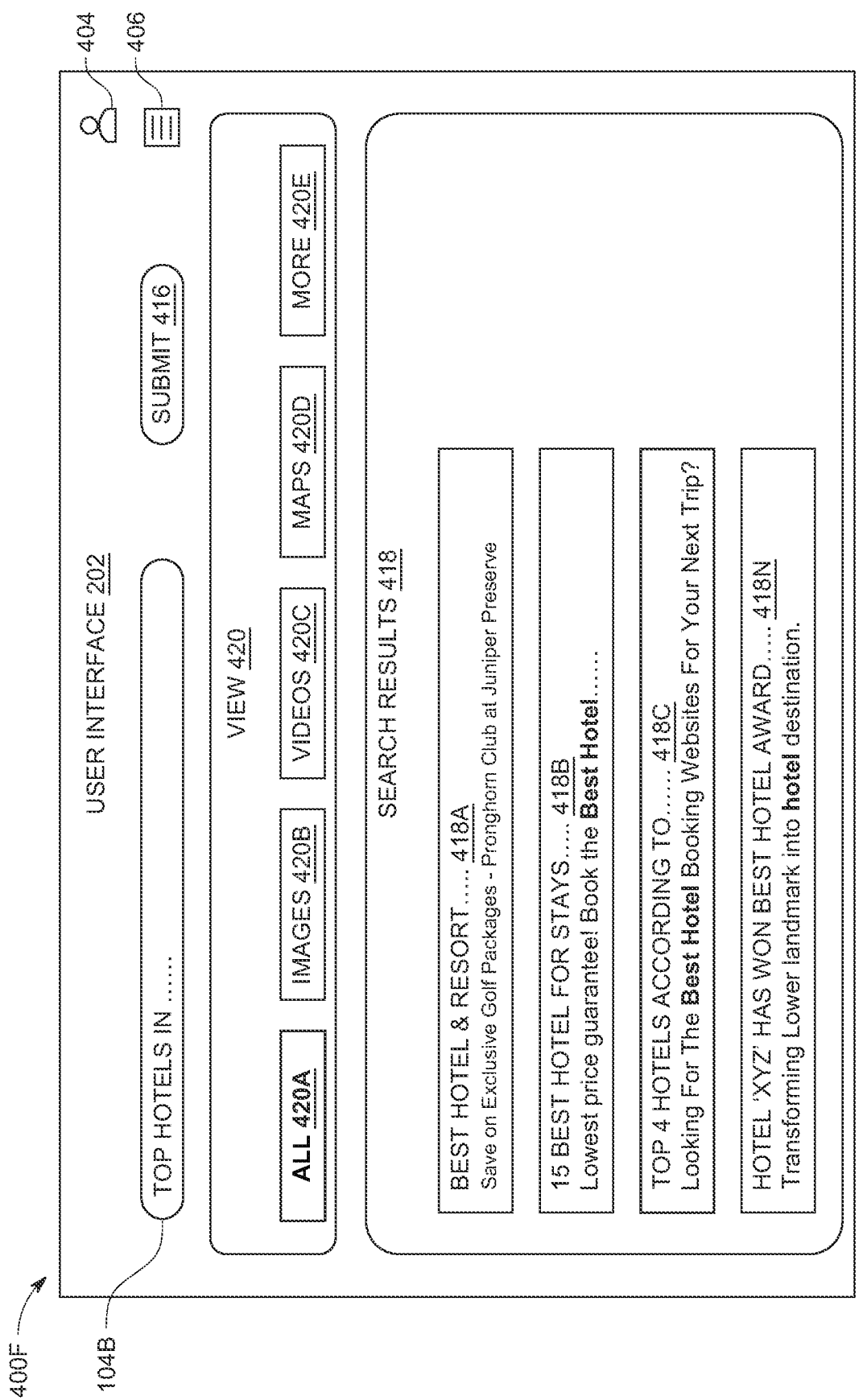
Figure 4G:
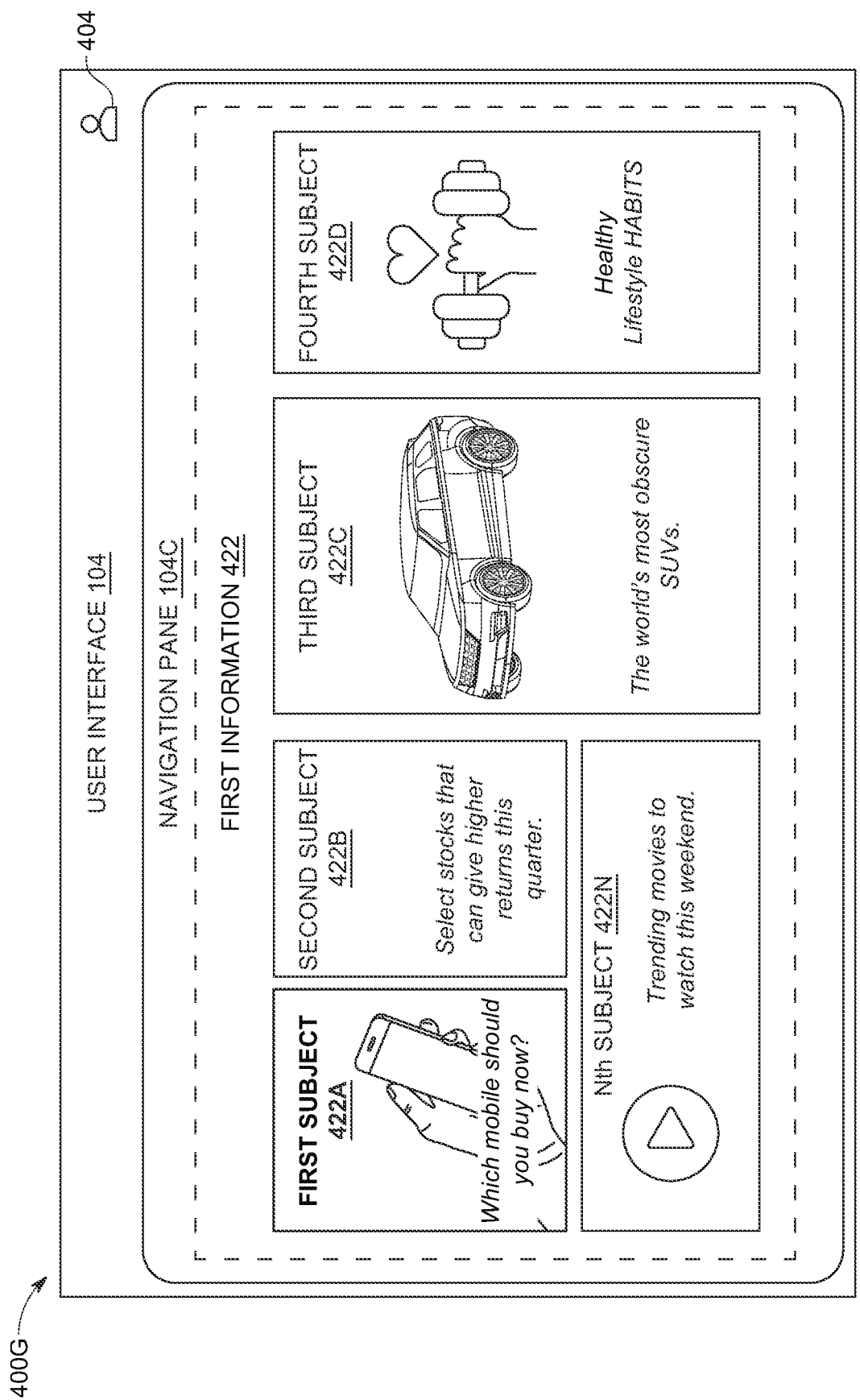
Figure 5:
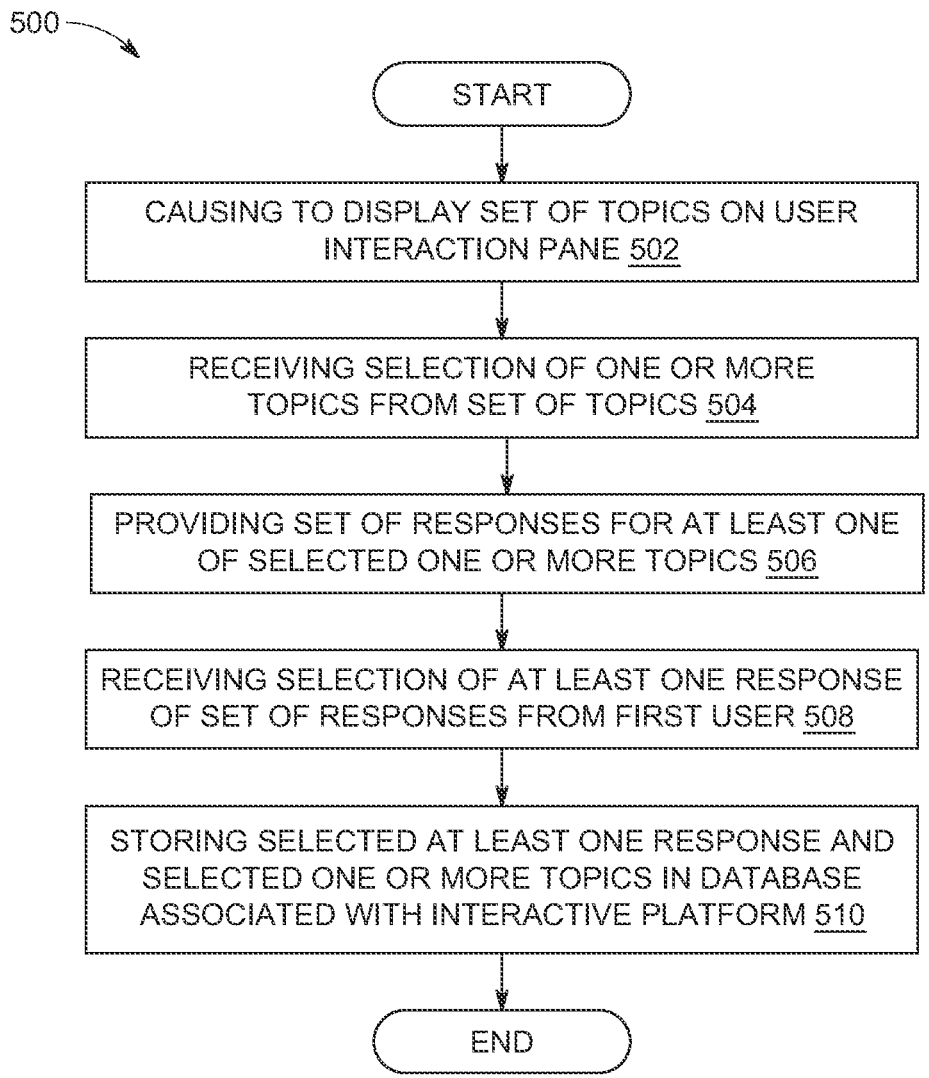

Having thus described example embodiments of the invention in general terms, reference will now be made to the accompanying drawings, which are not necessarily drawn to scale, and wherein:

FIG. 1 is a network environment of an interactive platform, according to one embodiment;

FIG. 2 is a block diagram of components of the interactive platform, according to one embodiment;

FIG. 3 is a schematic diagram of a user interface (UI) depicting creation of a user profile on the interactive platform, according to one embodiment;

FIG. 4A is a schematic diagram shows a user interaction pane of the UI depicting a set of topics, according to one embodiment;

FIG. 4B is a schematic diagram depicting a set of responses for a topic of the set of topics and control of the user interaction pane according to a first format selected by a first user, according to one embodiment;

FIG. 4C is a schematic diagram depicting control of the user interaction pane according to a second format selected by the first user, according to one embodiment;

FIG. 4D is a schematic diagram depicting control of the user interaction pane according to a third format selected by the first user, according to one embodiment;

FIG. 4E is a schematic diagram depicting selections of the first user on the user interaction pane, according to one embodiment;

FIG. 4F is a schematic diagram depicting a search UI element associated with the interactive platform, according to one embodiment;

FIG. 4G is a schematic diagram depicting a navigation pane of the UI associated with the interactive platform, according to one embodiment; and FIG. 5 is a flowchart of a method depicting utilization of the interactive platform by the first user, according to one embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Embodiments of the present disclosure may provide an interactive platform for providing information related to a plurality of categories, a method, and a computer program product for utilizing the interactive platform.

Generally, conventional digital platforms for providing information related to a plurality of categories may include platforms, such as web portals. The conventional digital platforms may be dedicated to only specific categories of the plurality of categories. In such a case, there may be a need to register on multiple websites to access different kinds of content that may be a cumbersome task for the user. Further, the registration on the multiple websites may be cost ineffective for the user in case the content is available only after a paid subscription. Moreover, the content provided on the conventional web portals may be biased and false as the content may be endorsed by multiple users for personal benefits. In addition to that, bots may be deployed by malicious entities to spread the false information or to promote particular stories or information on the conventional web portals. Therefore, the conventional digital platforms may further be inaccurate and unreliable.

On the other hand, the interactive platform of the present disclosure may be configured to provide information related to the plurality of categories under a single web portal. The interactive platform may for example, be associated with a database that may store the information related to the plurality of categories, or the interactive platform may communicate with third parties to provide the information. In some embodiments, the interactive platform may be configured to operate as a search engine, as well as a repository of the information of the plurality of categories that may be accessed on the interactive platform itself. In such a case, only a single registration may be required by the user to access and engage with the information related to the plurality of categories. Thus, usage of the interactive platform may be user friendly, cost effective and convenient for the users. Furthermore, the interactive platform may enable registration of only a single user account per user. The registration may further be verified based on, for example, unique identification associated with the user. In such a case, the interactive platform may eliminate deployment of the bots, as no registration may be possible without the unique identification associated with the user. Moreover, the interactive platform may be configured to provide a set of topics to the registered users, out of which selections may be made by the users based on personal preferences and opinions. As the interactive platform enables generation of the single user account per user, the selections may be made by the users may be genuine and reliable. Thus, the interactive platform may provide accurate information regarding the set of topics of the plurality of categories. Moreover, the interactive platform may enable formatting of the information presented to the user based on user preferences. Thus, the interactive platform may provide an enhanced engagement experience to the users.

The interactive platform, the method, and the computer program product for providing the information are described with reference to FIG. 1, FIG. 2, FIG. 3, FIG. 4A, FIG. 4B, FIG. 4C, FIG. 4D, FIG. 4E, FIG. 4F, FIG. 4G and FIG. 5 as detailed below.

FIG. 1 is a network environment 100 of an interactive platform, according to one embodiment, according to one embodiment. The network environment 100 may include an interactive platform 102, a user interface (UI) 104 that may be rendered on a display 106A of a user device 106, a data center 108, third party service providers 110, a communication network 112, and a first user 114. The UI 104 may further include a user interaction pane 104A, a search UI element 104B, and a navigation pane 104C. The data center 108 may further include a database 108a. The third party service providers 110 may further include N number of service providers, where N may be any natural number, for example, a first service provider 110A, a second service provider 110B, and an Nth service provider 110N. The interactive platform 102, the user device 106 and the database 108A and the third party service providers 110 may be communicatively coupled via the communication network 112.

The interactive platform 102 may be configured to perform one or more operations for providing information to the first user 114, such as causing to display a set of topics on the user interface 104, and receive selection of one or more topics from the displayed set of topics from the first user 114. The interactive platform 102 may further provide a set of responses for at least one of the selected one or more topics, and may receive selection of at least one response of the set of responses from the first user 114. The interactive platform 102 may further store the selected at least one response and the selected one or more topics in the database 108A.

In an example embodiment, the interactive platform 102 may be embodied in one or more of several ways as per the required implementation. For example, the interactive platform 102 may be embodied as a cloud-based service or a cloud-based platform. In each of such embodiments, the interactive platform 102 may be communicatively coupled to the components shown in FIG. 1 to carry out the desired operations and wherever required modifications may be possible within the scope of the present disclosure. The interactive platform 102 may be implemented in a device, such as the user device 106. Further, in one embodiment, the interactive platform 102 may be a standalone unit configured to provide the information regarding the plurality of categories to the first user 114. Alternatively, the interactive platform 102 may be coupled externally with the user device 106. In some example embodiments, the interactive platform 102 may be any user accessible device such as a mobile phone, a smartphone, a portable computer, and the like that are portable in themselves or as a part of another portable/mobile object. The interactive platform 102 may comprise a processor, a memory, and a network interface. The processor, the memory and the network interface may be communicatively coupled to each other. In some example embodiments, the interactive platform 102 may comprise a processing means such as a central processing unit (CPU), storage means such as read only memory (ROM) and random-access memory (RAM), a display enabled user interface such as a touch screen display, and other components as may be required for specific functionalities of network. Additional, different, or fewer components may be provided. For example, the interactive platform 102 may be configured to execute and run mobile applications such as a search application, a browser application, a social media application, and the like. In an embodiment, the interactive platform 102 may be accessed as a web browser, or as a software application installed on the user device 106. In some example embodiments, the interactive platform 102 may serve the dual purpose of a data gatherer and a beneficiary device.

The UI 104 may be rendered by the interactive platform 102 on the display 106A. The UI 104 may be utilized as a means to engage with the interactive platform 102 by the first user 114. The UI 104 may include various UI elements that may include functionalities to enable interaction between the interactive platform 102 and the first user 114. The UI 104 may provide various functionalities, such as via the user interaction pane 104A that may be used to provide some daily responses or choices as preferred responses by the first user 114. The search UI element 104B of the UI 104 may be utilized by the first user 114 to search access information about the plurality of categories. The navigation pane 104C of the UI 104 may be utilized by the first user 114 to browse information related to a plurality of subjects on the interactive platform 102.

The user device 106 may be configured to provide access to the UI 104 to the first user 114. In some example embodiments, the user device 106 may be any user accessible device such as a mobile phone, a smartphone, a portable computer, and the like, as a part of another portable/mobile object. The user device 106 may comprise a processor, a memory, and a network interface. The processor, the memory and the network interface may be communicatively coupled to each other. In some example embodiments, the user device 106 may be associated, coupled, or otherwise integrated with the system interactive platform 102, a portable navigation device, an infotainment system and/or other device that may be configured to provide the information to the first user 114. In such example embodiments, the user device 106 may comprise processing means such the CPU, storage means such as the ROM and the RAM, the display 106A that enables rendering of the UI 104, and other components as may be required for specific functionalities of the user device 106. For example, the display 106A may be a touch screen display. Examples of the display 106A may include, but may not be limited to, different types of light emitting diode (LED) display, a cathode ray tube (CRT) display, different types of liquid crystal display (LCD) and plasma display. In some embodiments, the display 106A may be communicatively coupled to the user device 106 respectively via the communication network 112. Additional, different, or fewer components may be provided. In one embodiment, the user device 106 may be directly coupled to the interactive platform 102. In some example embodiments, the user device 106 may be coupled to the interactive platform 102 via the communication network 112. For example, the user device 106 may be a consumer device (or a part thereof) and may be a beneficiary of the services provided by the interactive platform 102.

The data center 108 may data center be for example, a facility that may provide shared access to the database 108A using a complex network and storage infrastructure. For example, the database 108A may be a central repository of data created and managed by the interactive platform 102. The database 108A may include suitable logic, circuitry, code, and/or interfaces that may be configured to store the information associated with the plurality of categories. For example, the plurality of categories may include any subject matter for which information may be available. The database 108A may further store the set of topics and corresponding set of responses generated by the interactive platform 102. In an embodiment, the database 108A may store program instructions to be executed by the interactive platform 102. Example implementations of the database 108A may include, but are not limited to, a centralized database, a distributed database, a no structured query language (NoSQL) database, a cloud database, a relational database, a network database, an object-oriented database, and a hierarchical database.

The third party service providers 110 may be configured to provide content or information associated with the plurality of categories. In some embodiments, the interactive platform 102 may communicate with the third party service providers 110 to retrieve some information related to the subject queried by the first user 114 on the interactive platform 102. The third party service providers 110 may be associated with, for example, a plurality of platforms corresponding to conventional web portals and search engines. The third party service providers 110 may provide any type of content, such as textual content, video content, image content, etc. associated with the query provided by the first user 114.

The communication network 112 may be wired, wireless, or any combination of wired and wireless communication networks, such as cellular, Wi-Fi, internet, local area networks, or the like. In one embodiment, the communication network 112 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. The interactive platform 102, the user device 106 and the database 108A and the third party service providers 110 may be communicatively coupled via the communication network 112.

In operation, the first user 114 may require viewing trending set of topics related to a plurality of categories. The interactive platform 102 may be accessed by the first user 114 as the browser application on the user device 106. In order to utilize the interactive platform 102, the user 114 may need to create a user profile on the interactive platform 102. In some embodiments, the interactive platform 102 may receive profile information based on at least the unique ID of the first user 114 that may ensure that only one account per user may be created on the interactive platform 102. Details of creation of the user profile are further provided, for example, in FIG. 3.

In an embodiment, the plurality of categories may be associated with any topic such as current affairs, education, travel, food and so forth. The interactive platform 102 may cause to display the set of topics on the user interaction pane 104A of the UI 104. The set of topics may be generated based on inputs received from a plurality of users registered on the interactive platform 102, and information associated with the plurality of categories available on a plurality of platforms on the web. For example, the set of topics may include trending topics such as "Top 10 countries to travel", "Can Artificial intelligence replace jobs", "Earthquake in Turkey", and so forth. The interactive platform 102 may further provide a set of responses for at least one of the selected one or more topics. For example, the interactive platform 102 may provide a list of top 10 countries to visit as responses for the topic "Top 10 countries to travel". The interactive platform 102 may be utilized by the first user 114 to view such set of topics and respective responses and select preferred the one or more topics or one or more responses from the set of responses. The interactive platform 102 may further enable reception of selections of the one or more topics and/or the one or more responses from the first user 114. The interactive platform 102 may also display data regarding the selections of the preferred one or more topics or one or more responses made by the plurality of users registered on the interactive platform 102 in various formats. In such a manner, accurate opinions, and choices of users, such as the first user 114 regarding the set of topics that may be trending may be received and viewed by the registered plurality of users. Details of the selection of the set of topics and the set of responses are further provided, for example, in FIG. 4A and FIG. 4B.

In some embodiments, the interactive platform 102 may be configured to control the user interaction pane 1044A of the UI 104 to format data associated with the plurality of users and the plurality of categories based on the format selected by the first user 114. For example, the first user 114 may require viewing the selections of the preferred one or more topics or one or more responses made by the plurality of users based on different categorizations such as age, gender etc. The data may further be formatted based on a plurality of visual graphics, such as a pie chart, bar graph, etc. Details of formatting the data are further provided, for example, in FIG. 4B, FIG. 4C and FIG. 4D. In some embodiments, the interactive platform 102 may further enable viewing all the responses and the topics selected on the interactive platform 102 by the first user 114, details of which are provided, for example, in FIG. 4E.

Furthermore, in an embodiment, the user 114 may require conducting searches associated with the plurality of categories. The interactive platform 102 may be configured to receive a search query via the search UI element 104B. For example, the search query may be "Define gravitational force". The interactive platform 102 may provide one or more search results corresponding to the received search query. For example, the one or more search results may include some textual information, visual information, audio information, and the audio-visual information associated with the received search query. The one or more search results may also include hyperlinks that may be used by the first user 114 to obtain the information regarding the search query. Details of the search UI element 104B are further provided, for example, in FIG. 4F.

Moreover, in an embodiment, the user 114 may require navigating or browsing through first information associated with a plurality of subjects in the plurality of categories. For example, the plurality of subjects may include trending subjects, or the subjects determined based on the preference of the first user 114. The navigation pane 104C may be utilized to access and engage with the plurality of subjects by the first user 114. Details of the navigation pane 104C are further provided, for example, in FIG. 4G.

FIG. 2 is a block diagram 200 of components of the interactive platform 102, according to one embodiment. FIG. 2 is explained in conjunction with elements of FIG. 1. The interactive platform 102 may include a processing means such as at least one processor 202 (hereinafter, also referred to as "processor 202"), storage means such as at least one memory 204 (hereinafter, also referred to as "memory 204"), and a communication means such as at least one communication interface 206 (hereinafter, also referred to as "communication interface 206").

The processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally, or alternatively, the processor 201 may include one or more processors configured in tandem via the bus to enable independent execution of instructions, pipelining and/or multithreading.

The processor 202 may further include one or more processing modules, such as a user profile creation module 202A, a topic displaying module 202B, a topic reception module 202C, a response reception module 202D, a storage module 202E, a user interface control module 202F, a search result providing module 202G and a navigation pane providing module 202H.

The user profile creation module 202A may be configured to receive profile information of the first user 114 via the UI 104. The profile information of the first user 114 may be verified based on the unique ID of the first user 114. The user profile creation module 202A may further create the user profile for the first user 114 based on the verified profile information.

The topic displaying module 202B may be configured to display the generated set of topics on the user interaction pane 104A of the UI 104. In an embodiment, the topic displaying module 202B may generate the set of topics based on the inputs received from the plurality of users on the interactive platform 102. The set of topics may be top trending topics on the web or the interactive platform 102.

The topic reception module 202C may be configured to receive selection of one or more topics from the displayed set of topics from the first user 114 via the user interaction pane 104A. The received selection of the interactive platform 102 may be based on the preference of the first user 114.

The response reception module 202D may be configured to receive selection of at least one response of the set of responses provided to the first user 114. The set of responses may be provided for at least one of the one or more topics selected by the first user 114. In an embodiment, the response reception module 202D may be configured to generate the set of responses based on at data associated with the set of topics, or the plurality of inputs for the respective topic received from the plurality of users.

The storage module 202E may be configured to store the selected at least one response and the selected one or more topics in the database 10A associated with the interactive platform 102. The stored at least one response and the selected one or more topics may be utilized to provide insights for the one or more topics to the plurality of users of the interactive platform 102.

The user interface control module 202F may be configured to control the UI 104 to format the data associated with the plurality of users and the plurality of categories. In some embodiments, the set of topics may be formatted to be displayed according to the formats selected by the first user 114. The formatting may be performed based on categorization such as the age, gender, geographical region, or the visual graphics such as the pie chart, bar graph and the like.

The search result providing module 202G may be configured to receive the search query from the first user 114. Based on the received search query, the search result providing module 202G may provide one or more search results. The one or more search results may include, for example, textual information, visual information, audio information, and an audio-visual information associated with the received search query.

The navigation pane providing module 202H may be configured to provide the navigation pane 104C on the UI 104. The navigation pane providing module 202H may further receive navigational input from the first user 114. The navigational input from the first user 114 may be associated with engagement of the first user 114 with the first information on the interactive platform 102.

Additionally, or alternatively, the processor 202 may include one or more processors capable of processing large volumes of workloads and operations to provide support for big data analysis. In an example embodiment, the processor 202 may be in communication with the memory 204 via a bus for passing information among components coupled to the interactive platform 102.

The memory 204 may be non-transitory and may include, for example, one or more volatile and/or non-volatile memories. In other words, for example, the memory 204 may be an electronic storage device (for example, a computer readable storage medium) comprising gates configured to store data (for example, bits) that may be retrievable by a machine (for example, a computing device like the processor 202). The memory 204 may be configured to store information, data, content, applications, instructions, or the like, for enabling the apparatus to carry out various functions in accordance with an example embodiment of the present disclosure. For example, the memory 204 may be configured to buffer input data for processing by the processor 202. As exemplarily illustrated in FIG. 2, the memory 204 may be configured to store instructions for execution by the processor 202. As such, whether configured by hardware or software methods, or by a combination thereof, the processor 202 may represent an entity (for example, physically embodied in circuitry) capable of performing operations according to an embodiment of the present disclosure while configured accordingly. Thus, for example, when the processor 202 is embodied as an ASIC, FPGA or the like, the processor 202 may be specifically configured hardware for conducting the operations described herein. Alternatively, as another example, when the processor 202 is embodied as an executor of software instructions, the instructions may specifically configure the processor 202 to perform the algorithms and/or operations described herein when the instructions are executed. However, in some cases, the processor 202 may be a processor specific device (for example, a mobile terminal or a fixed computing device) configured to employ an embodiment of the present disclosure by further configuration of the processor 202 by instructions for performing the algorithms and/or operations described herein. The processor 202 may include, among other things, a clock, an arithmetic logic unit (ALU) and logic gates configured to support operation of the processor 202.

The network interface 206 may comprise input interface and output interface for supporting communications to and from the interactive platform 102 or any other component with which the interactive platform 102 may communicate. The network interface 206 may be any means such as a device or circuitry embodied in either hardware or a combination of hardware and software that is configured to receive and/or transmit data to/from a communications device in communication with the interactive platform 102. In this regard, the network interface 206 may include, for example, an antenna (or multiple antennae) and supporting hardware and/or software for enabling communications with a wireless communication network. Additionally, or alternatively, the network interface 206 may include the circuitry for interacting with the antenna(s) to cause transmission of signals via the antenna(s) or to handle receipt of signals received via the antenna(s). In some environments, the network interface 206 may alternatively or additionally support wired communication. As such, for example, the network interface 206 may include a communication modem and/or other hardware and/or software for supporting communication via cable, digital subscriber line (DSL), universal serial bus (USB) or other mechanisms. In some embodiments, the network interface 206 may enable communication with a cloud-based network to enable deep learning.

FIG. 3 is a schematic diagram 300 of the UI 104 depicting creation of a user profile on the interactive platform 102, according to one embodiment. FIG. 3 is explained in conjunction with elements of FIG. 1 and FIG. 2. The UI 104 may include a profile creation pane 302. The profile creation pane 302 may include UI elements to receive profile information 304, such as personal information 306, biometric information 308 and at least one unique ID 310 (referred as unique ID 310 hereinafter). The profile creation pane 302 may further include a message 312, a sign up UI element 314, and a login UI element 316.

The profile creation pane 302 may be utilized by the first user 114 to create the user profile on the interactive platform 102 by providing the profile information 304. In some embodiments, the user profile creation module 202A may be configured to receive the profile information 304 of the first user 114 via the UI 104. The received profile information 304 may include at least the personal information 306 and the unique ID 310 of the first user 114. The personal information 306 may include information that may be used to identify an individual, for example, the first user 114. Examples of the personal information 306 may include, but is not limited to, a name, a title, an electronic mail (email), and a contact number associated with the first user 114. Further, the personal information 306 may include a password associated with the user profile of the first user 114 that may be set by the first user 114. The password may include any character such as numbers, alphabets, special characters and/or a combination thereof.

In some embodiments, the unique ID 310 of the first user 114 may include at least one of a social security number, a driving license ID, a passport number, and an individual taxpayer identification (ITIN) number of the first user 114. For example, the unique ID 310 may be any ID issued by government or a legal authority of a place associated with the first user 114. The unique ID 310 may be utilized to distinguish between the plurality of users associated with the interactive platform 102. In an embodiment, providing details of the unique ID 310 may be mandatory to create the user profile on the interactive platform 102.

In some embodiments, the received profile information 304 may further include the biometric information 308 of the first user 114. The biometric information 308 may include biometric data such as, fingerprints information, retinal scans, facial scans of the first user 114, and so forth. In an example, the biometric information 308 may be received by use of a set of sensors associated with the user device 106. Examples of the set of sensors may include, but are not limited to, a fingerprint sensor and an imaging sensor such as a camera.

The user profile creation module 202A may be further configured to verify the received profile information 304 based on the unique ID 310 of the first user 114. In an embodiment, the profile creation pane 302 may be configured to verify the received profile information 304 based on the biometric information 308 of the first user 114. The verification may be performed to ensure that the unique ID 310 of the first user 114 is different from unique IDs, or the biometric information 308 of the first user 114 is different from the biometric information of the plurality of users registered on the interactive platform 102. In such a manner, the interactive platform 102 may enable creation of only one user profile per user. In order to inform the first user 114, regarding creation of only one user profile, the message 312 that may read "one user can only have one account" may be displayed on the UI 104.

Once the profile information 304 may be received from the first user 114, the sign up UI element 314 may be utilized by the first user 114 to create the user profile. The user profile creation module 202A may create the user profile for the first user 114 based on the verified profile information. Once the user profile is created, the login UI element 316 may be utilized by the first user 114 to login to the user profile on the interactive platform 102.

FIG. 4A is a schematic diagram 400A shows the user interaction pane 104A of the UI 104 depicting a set of topics 402, according to one embodiment. FIG. 4A is explained in conjunction with elements of FIG. 1, FIG. 2 and FIG. 3. The schematic diagram 400A depicts the UI 104 that may include the user interaction pane 104A. The user interaction pane 104A may display the set of topics 402, a user profile UI element 404, and a menu UI element 406.

The UI 104 may further depict UI elements that may be utilized to redirect to the search UI element 104B and the navigation pane 104C of the UI 104. The user profile UI element 404 may be utilized by the first user 114 to view the uploaded profile information 304. In some embodiments, the interactive platform 102 may enable updating some of the personal information 306 such as the email of the first user 114 by use of the user profile UI element 404. The menu UI element 406 may further be utilized by the first user 114 to access options such as settings, payment information, theme of the interactive platform 102 and the like.

In some embodiments, the user interaction pane 104A may be selected by the first user 114. The topic displaying module 202B of the processor 202 may cause to display the set of topics 402 on the user interaction pane 104A of the UI 104. The set of topics 402 may be related to the plurality of categories. In one or more embodiments, the plurality of categories may include any type of category for which information may be available on the web. For example, the plurality of categories may relate to current affairs, economics, politics, environment, education, travel, food, entertainment, gadgets, and so forth.

In some embodiments, the set of topics 402 may be segmented based on the plurality of categories. For example, the user interaction pane 104A may display the plurality of categories such as the current affairs, the economics, the politics, the environment, the education, the travel, etc. A category of the plurality of categories may be selected by the first user 114 to view the topics of the set of topics 402 belonging to the selected category. In an embodiment, the menu UI element 406 may further be utilized to view a list of the plurality of categories from which the first user 114 may select the desired category.

The set of topics 402 may be for example, trending topics or subject matters that are popular at a moment the set of topics 402 are being viewed by the first user 114. The displayed set of topics 402 may change as trends in popularity of the set of topics 402 change. The set of topics 402 may include, for example, N number of topics, such as a first topic 402A, a second topic 402B, a third topic 402C, a fourth topic 402D and an Nth topic 402N. The number of the set of topics 402 may vary. In an embodiment, the number of the set of topics 402 may be 10. In another example, the number of the set of topics 402 may be 100. In an example, the number of the set of topics 402 to be displayed may be set by the first user 114. Details of generation of the set of topics 402 based on the trends are further provided, for example, in FIG. 4G.

In an exemplary scenario, the first topic 402A may correspond to "Can Artificial intelligence replace jobs". The second topic 402B may correspond to "Can developing countries be blamed for global warming". The third topic 402C may correspond to "Earthquake in Turkey". The fourth topic 402D may correspond to "Top 10 countries to travel" and the Nth topic 402N may correspond to "All about Roman empire". As depicted, the set of topics 402 may be the most popular topics for the moment or for the days. For example, the third topic 402C "Earthquake in Turkey" may be a recently occurred event that may be included in the set of topics 402. In another example, the first topic 402A "Can Artificial intelligence replace jobs" may be a trending topic on the web that may be included in the set of topics 402.

The topic reception module 202C may be configured to receive selection of one or more topics from the displayed set of topics 402 from the first user 114 via the user interaction pane 104A. The selection of the one or more topics may be based on a preference of the first user 114. For example, the one or more topics that may interest the first user 114, may be selected by the first user 114. In an exemplary scenario, the first topic 402A "Can Artificial intelligence replace jobs" may be selected by the first user 114. The operations after selection of the first topic 402A are further described in FIG. 4B.

FIG. 4B is a schematic diagram 400B depicting a set of responses for a topic of the set of topics 410 and control of the user interaction pane 104A according to a first format selected by the first user 114, according to one embodiment. FIG. 4B is explained in conjunction with elements of FIG. 1, FIG. 2, FIG. 3 and FIG. 4A. The schematic diagram 400B depicts the UI 104 that may include the user interaction pane 104A. The user interaction pane 104A may display the first topic 402A. The user interaction pane 104A may further display a categorization UI element 408. The user interaction pane 104A may further display corresponding set of responses 410 for the first topic 402A.

The processor 202 may be configured to provide the set of responses for at least one of the selected one or more topics of the set of topics 402. For example, depicted are the set of responses 410 for the first topic 402A selected by the first user 114. In an exemplary scenario, the first topic 402A may be the selected topic of the first user 114. Once the first topic 402A may be selected, the response reception module 202D of the processor 202 may display the set of responses 410 for the first topic 402A. In an embodiment, the set of responses 410 may be a set of opinions on the first topic 402A. In another embodiment, the set of responses 410 may be a set of solutions for the first topic 402A. The set of responses 410 may be generated based on at least one of data associated with respective topic of the set of topics 402, or a plurality of inputs for the respective topic received from the plurality of users of the interactive platform 102. For example, the most popular opinions regarding the set of topics 402 on the web may be used to generate the set of responses 410. Moreover, the responses entered as the input by the plurality of users and the selected responses by the plurality of users for the first topic 402A may be used to generate the set of responses 410. Details of the generation of the set of responses 410 are further provided, for example, in FIG. 4G.

The processor 202 may be configured to receive selection of at least one response of the set of responses 410 from the first user 114. The selected at least one response indicates a choice of the first user 114 for the respective topic of the selected one or more topics. In an exemplary scenario, the set of responses 410 may include a first response 410A, a second response 410B, a third response 410C, a fourth response 410D. Based on the opinion or the choice of the first user 114, for example, the second response 410B may be selected by the first user 114 as the preferred response.

In some embodiments, the processor 202 may be configured to receive a user response as an input from the first user 114, for the first topic 402A. For example, the set of responses 410 may include a response reception UI element 410N that may be utilized by the first user 114 to enter the user response for the first topic 402A. For example, the first user 114 may wish to add a response for the first topic 402A that may be different from the given set of responses 410. In such a case, the user response may be entered by using the response reception UI element 410N. The user response may be processed to determine information included in the user response. Based on the processed user response, the processor 202 may store the generated additional response in the database 108A. For example, the user response may be similar to one of the set of responses 410. In such a case, the user response may be considered same as the response the user response is similar to, and no additional response may be generated. In another example, the user response may be a different response than the set of responses 410. Moreover, one or more of the plurality of users may have also provided a similar response for the first topic 402A. In such a case, the user response may be stored as the additional response in the database 108A.

In some embodiments, the selected at least one response may include at least one primary response and at least one secondary response. The primary response and the secondary response may indicate the choice of the first user 114 related to the selected one or more topics in a chronological order. As depicted in the schematic diagram 400B, the second response 410B may be selected by the first user 114. However, multiple topics of the set of topics 402 and multiple responses of the set of responses 410 may be selected by the first user 114 as the at least one response. In an embodiment, one primary response and four secondary responses may be selected as the at least one response. For example, one primary response and four secondary responses may be selected each day by the first user 114.

In an exemplary scenario, the second response 410B of the first topic 402A may be selected as the primary response by the first user 114. A first response of the second topic 402B may be selected as a first secondary response. The third topic 402C may be selected as a second secondary response. It may be noted that the third topic 402C may be just a current event that may have occurred, and it may have no generated responses. For topics such as these, the topic itself may be selected as the response. Moreover, a third response of the fourth topic 402D may be selected as a third secondary response, and the like.

In some examples, multiple responses may also be selected from a common topic. In an exemplary scenario, the second response 410B of the first topic 402A may be selected as the primary response by the first user 114. A first response 410A of the first topic 402A again may be selected as a first secondary response. Moreover, a third response of the fourth topic 402D may be selected as a second secondary response, and so forth. Thus, in such a manner, the at least one response may be selected by the first user 114.

The processor 202 may be further configured to store the selected at least one response and the selected one or more topics in the database 108A associated with the interactive platform 102. The stored at least one response and the selected one or more topics may be utilized to provide insights for the one or more topics to the plurality of users of the interactive platform 102. For example, the selected primary response and the selected secondary responses that may include the responses as well as the topics selected as the response by the first user 114 may be stored in the database 108A. Similarly, the at least one response selected by the plurality of users on the interactive platform 102 may be stored in the database 108A. The stored responses may be utilized to provide the insights to the plurality of users as described below.

In some embodiments, the processor 202 may be further configured to control the user interaction pane 104A of the UI 104 based on one or more algorithms. The control may include formatting data associated with the plurality of users and the plurality of categories based on a format selected by the first user 114. For example, graphics and data representation on the user interaction pane 104A may be formatted based on the format selected by the first user 114. In an embodiment, the user interface control module 202F may be configured to control the user interaction pane 104A to format the data.

In one or more embodiments, the format selected by the first user 114 may be based on at least one of a geographical region wise categorization 408A, a race wise categorization 408B, an age wise categorization 408C, a gender wise categorization 408D and a nationality wise categorization 408N. For example, the categorization UI element 408 may be utilized by the first user 114 to select the format based on various categorizations. In an exemplary scenario, the age wise categorization 408C may be selected by the first user 114 to view the choices of one or more users of the plurality of users in a same age group (such as 25 to 35 years) as that of the first user 114. In such a case, the age wise categorization 408C may be selected by the first user 114, and the required age group may be provided as the input. In other examples, the age wise categorization 408C of the set of responses 410 that may include data of all the age groups may be provided to the first user 114.

In some embodiments, the format selected by the first user 114 may further be based on selection of a visual graphic from a plurality of visual graphics. For example, the plurality of visual graphics may include a bar graphs such as horizontal and vertical bar graphs, a pie chart, a line graph, a histogram, and the like. The visual graphic may be selected by the first user 114 to view the formatted data. As depicted in the schematic diagram 400B, the horizontal bar graph with depicted percentages may be used as the first format to depict the age wise categorization 408C of the set of responses 410. Other examples of the visual graphics are further provided in FIG. 4C and FIG. 4D.

FIG. 4C is a schematic diagram 400C depicting control of the user interaction pane 104A according to a second format selected by the first user 114, according to one embodiment. FIG. 4C is explained in conjunction with elements of FIG. 1, FIG. 2, FIG. 3, FIG. 4A and FIG. 4B. The schematic diagram 400C depicts the UI 104 that may include the user interaction pane 104A. The user interaction pane 104A may display the first topic 402A. The user interaction pane 104A may further display the categorization UI element 408. The user interaction pane 104A may further display corresponding set of responses 410 for the first topic 402A. The schematic diagram 400C depicts the pie chart representation as the second format selected by the first user 114. The pie chart representation shows the distribution of the selection of the set of responses 410 in the selected age group. Similarly, for the geographical region wise categorization 408A, the race wise categorization 408B, the gender wise categorization 408D and the nationality wise categorization 408N, the plurality of visual graphics may be utilized to view the formatted data.

FIG. 4D is a schematic diagram 400D depicting control of the user interaction pane 104A according to a third format selected by the first user 114, according to one embodiment. FIG. 4D is explained in conjunction with elements of FIG. 1, FIG. 2, FIG. 3, FIG. 4A, FIG. 4B and FIG. 4C. The schematic diagram 400D depicts the UI 104 that may include the user interaction pane 104A. The user interaction pane 104A may display the first topic 402A. The user interaction pane 104A may further display the categorization UI element 408. The user interaction pane 104A may further display corresponding set of responses 410 for the first topic 402A. The schematic diagram 400D depicts the vertical bar graph representation as the third format selected by the first user 114. The vertical bar graph representation shows the distribution of the selection of the set of responses 410 in the selected age group. Similarly, for the geographical region wise categorization 408A, the race wise categorization 408B, the gender wise categorization 408D and the nationality wise categorization 408N, the plurality of visual graphics, such as the vertical bar graph representation may be utilized to view the formatted data. Thus, the interactive platform 102 may be configured to provide insights to the plurality of users in an interactive and user friendly manner.

FIG. 4E is a schematic diagram 400E depicting selections of the first user 114 on the user interaction pane 104, according to one embodiment. FIG. 4E is explained in conjunction with elements of FIG. 1, FIG. 2, FIG. 3, FIG. 4A, FIG. 4B, FIG. 4C and FIG. 4D. The schematic diagram 400E depicts the UI 104 that may include the user interaction pane 104A.

In some embodiments, the user interaction pane 104A may be configured to display daily choices 412, i.e., the at least one response selected by the first user 114. For example, the menu UI element 406 may further be utilized by the first user 114 to view the daily choices 412. The daily choices 412 may include a primary choice 412A, a first secondary choice 412B, a second secondary choice 412C and an Nth secondary choice 412N. The daily choices 412 may be displayed in the chronological order. In some embodiments, a calendar UI element 414 may be provided on the user interaction pane 104A. The calendar UI element 414 may be utilized by the first user 114 to view the daily choices 412 made by the first user 114 previously on the interactive platform 102.

FIG. 4F is a schematic diagram 400F depicting the search UI element 104B associated with the interactive platform 102, according to one embodiment. FIG. 4F is explained in conjunction with elements of FIG. 1, FIG. 2, FIG. 3, FIG. 4A, FIG. 4B, FIG. 4C, FIG. 4D and FIG. 4E. The schematic diagram 400F depicts the search UI element 104B that may be utilized by the first user 114 to search for different queries. The UI 104 may further include a submit UI element 416, search results 418 and a view UI element 420.

The search UI element 104B may be utilized by the first user 114 to conduct searches associated with the plurality of categories on the interactive platform 102. In some embodiments, the search result providing module 202G may be configured to receive the search query from the first user 114. The search query may be received from the first user 114 when the submit UI element 416 may be clicked by the first user 114. For example, the search query may correspond to "Top hotels in my area". Based on the received search query, the search result providing module 202G may provide one or more search results, such as the search results 418.

The one or more search results may include, for example, textual information, visual information, audio information, and an audio-visual information associated with the received search query. The search results 418 may include N number of search results such as a first search result 418A, a second search result 418B, a third search result 418C, and Nth search result 418N that may include different types of information. Moreover, the view UI element 420 may be utilized by the first user 114 to segregate the type of information required by the first user 114. For example, an all UI element 420A may be utilized to view all the types of information provided as the one or more search results. An images UI element 420B may be utilized to view the visual information provided as the one or more search results. A videos UI element 420C may be utilized to view the audio-visual information provided as the one or more search results. Similarly, a maps UI element 420D and a more UI element 420E may be utilized to view different types of information provided as the one or more search results.

In some embodiments, the processor 202 may be configured to receive the provided one or more search results 418 corresponding to the received search query from one of the database 108A, and the third-party service providers 110 associated with a plurality of platforms. In an example, the interactive platform 102 may be associated with the database 108A that may be a part of the data center 108. The database 108A may be a dedicated database 108A that may include the information about the plurality of categories. The database 108A may be regularly updated based on events occurring in the world. In another example, the plurality of platforms may be the web portals that may include the information regarding the plurality of categories. The interactive platform 102 may be configured to communicate with the third-party service providers 110 of the plurality of platforms that may provide the information about the plurality of categories upon reception of the search query.

FIG. 4G is a schematic diagram 400G depicting the navigation pane 104C of the UI 104 associated with the interactive platform 102, according to one embodiment. FIG. 4G is explained in conjunction with elements of FIG. 1, FIG. 2, FIG. 3, FIG. 4A, FIG. 4B, FIG. 4C, FIG. 4D, FIG. 4E and FIG. 4F. The schematic diagram 400G depicts the navigation pane 104C that may be utilized by the first user 114 to browse through various subjects of the plurality of categories. The navigation pane 104C may include first information 422.

In some embodiments, the navigation pane providing module 202H may be configured to provide the navigation pane 104C on the UI 104. The navigation pane 104C may include the first information 422 associated with a plurality of subjects in the plurality of categories. For example, the displayed first information 422 may be customized for each user, such as the first user 114. In an embodiment, the first information 422 may be customized based on a search history of the first user 114. In an example, the first information 422 may be customized based on a preference of the first user 114. The preference of the type of the plurality of subjects may be provided by the first user 114. In an exemplary scenario, the first information 422 may include a first subject 422A, a second subject 422B, a third subject 422C, a fourth subject 422D and an Nth subject 422N. In an example, the first subject 422A and the second subject 422B may be the preferred subjects of the first user 114. The third subject 422C, the fourth subject 422D and the Nth subject 422N may be the trending subjects on the web.

The navigation pane providing module 202H may be configured to receive navigational input from the first user 114. The navigational input from the first user 114 may be associated with engagement of the first user 114 with the first information 422 on the interactive platform 102. For example, information of the first subject 422A may require to be accessed by the first user 114. The selection of the first subject 422A may be received as the navigational input from the first user 114. Moreover, an amount of time spent on the first subject 422A, a preferred time of the day for accessing the first information, etc. may be received as the navigational input from the first user 114. Similarly, for each of the plurality of users registered on the interactive platform 102, the navigational input may be received.

In some embodiments, the processor 202 may be configured to generate the displayed set of topics based at least one of second information associated with the set of topics 402 received from the third-party service providers 110 associated with the plurality of platforms, and the navigational input received from the plurality of users of the interactive platform 102. For example, the second information associated with the set of topics 402 may indicate the trending topics on the web. In an example, an event such as an earthquake may have occurred. In such a case, the second information may include news about the earthquake on the plurality of platforms. In another example, the news of the event may be reshared by multiple users on the web, which may be included in the second information. Furthermore, the navigational input received from the plurality of users may indicate the top subjects of interest for the plurality of users. Thus, based on the second information and the navigational input, the set of topics 402 may be generated.

In some embodiments, the processor 202 may be configured to process the data associated with respective topic of the set of topics 402. The data may be included in the second information associated with the set of topics 402. For example, the second information may indicate the most engaged and trending topics on the web. The processor 202 may further process the plurality of inputs for the respective topic of the set of topics 402 received from the plurality of users. The plurality of inputs may be included in the navigational input received from the plurality of users. For example, the plurality of inputs may indicate an amount of engagement of the plurality of users with the set of topics 402.

In some embodiments, the processor 202 may be configured to utilize one or more artificial intelligence (AI) models to process the data associated with respective topic of the set of topics 402 and the plurality of inputs for the respective topic of the set of topics 402. For example, the AI models may be conventional AI models used to process the data associated with respective topic of the set of topics 402 and the plurality of inputs. In an example, the AI models may be linear regression models, neural networks, logistic regression models, and so forth. Based on the processed data associated with respective topic, and the plurality of inputs for the respective topic of the set of topics 402, the processor 202 may generate the provided set of responses 410. The generated set of responses 410 may be displayed on the user interaction pane 104A.

FIG. 5 is a flowchart of a method 500 depicting utilization of the interactive platform 102 by the first user 114, according to one embodiment. FIG. 5 is explained in conjunction with elements of FIG. 1, FIG. 2, FIG. 3, FIG. 4A, FIG. 4B, FIG. 4C, FIG. 4D, FIG. 4E, FIG. 4F and FIG. 4G. It will be understood that each block of the flow diagram of the method 500 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 204 of the interactive platform 102, employing an embodiment of the present disclosure and executed by a processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 500 illustrated by the flowchart diagram of FIG. 5 is used for the utilization of the interactive platform 102 by the first user 114. Fewer, more, or different steps may be provided.

At step 502, the set of topics 402 may be displayed on the user interaction pane 104A of the UI 104 associated with the interactive platform 102. The set of topics 402 may be related to the plurality of categories. For example, the plurality of the categories may include infotainment, education, sports, entertainment, politics, lifestyle, automobile, health etc. The first user 114 may be able to interact with the one or more topic by utilizing the user interaction pane 104A of the UI 104. Details of display of the set of topics 402 are further provided, for example, in FIG. 4A.

At step 504, selection of the one or more topics from the displayed set of topics 402 may be received from the first user 114 via the user interaction pane 104. The selection of the one or more topics may be based on the preference of the first user 114. For example, the first user 114 may select the one or more topics by clicking on the one or more topics based on their preference. Details of selection of the one or more topics are further provided, for example, in FIG. 4A.

At step 506, the set of responses 410 for at least one of the selected one or more topics may be provided. The provided set of responses 410 for the at least one of the selected one or more topics may be generated based on at least one of data associated with respective topic of the set of topics 402, and the plurality of inputs for the respective topic received from the plurality of users of the interactive platform 102. For example, the processor 202 may be configured to generate the set of responses 410 for the at least one of the selected one or more topics based on the data available in the database 108a about the respective topic. Further, the set of responses 410 may also be generated based on the plurality of inputs (e.g., responses) provided by the plurality of users. Details providing the set of responses 410 are further provided, for example, in FIG. 4B.

At step 508, selection of the at least one response of the set of responses 410 may be received from the first user 114. The selected at least one response may indicate a choice of the first user 114 for the respective topic of the selected one or more topics. For example, the first user 114 may choose the at least one response as a solution to the at least one of the selected one or more topic based on their preference. Details of selection of the at least one response are further provided, for example, in FIG. 4B.

At step 510, the selected at least one response and the selected one or more topics may be stored in the database 108a associated with the interactive platform 102. The stored at least one response and the selected one or more topics are utilized to provide insights for the one or more topics to the plurality of users of the interactive platform 102. Details of storing the at least one response and the selected one or more topics are further provided, for example, in FIG. 4B.

The method 500 may be implemented using corresponding circuitry. For example, the method 500 may be implemented by an apparatus or system comprising a processor, a memory, and a network interface of the kind discussed in conjunction with FIG. 2.

In some example embodiments, a computer programmable product may be provided. The computer programmable product may comprise at least one non-transitory computer-readable storage medium having stored thereon computer-executable program code instructions that when executed by a computer, cause the computer to execute the method 500.

In an example embodiment, an apparatus for performing the method 500 of FIG. 5 above may comprise a processor (e.g. the processor 202) configured to perform some or each of the operations of the method of FIG. 5 described previously. The processor may, for example, be configured to perform the operations (502-510) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (502-510) may comprise, for example, the processor 202 which may be implemented in the interactive platform 102 and/or a device or circuit for executing instructions or executing an algorithm for processing information as described above.

Many modifications and other embodiments of the disclosure set forth herein will come to mind to one skilled in the art to which these inventions pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An interactive platform, comprising:
at least one non-transitory memory configured to store computer executable instructions; and
at least one processor configured to execute the computer executable instructions to:
enable registration of a plurality of users on the interactive platform, wherein each of the plurality of users is registered using a single user account associated with the interactive platform;
receive, from a registered first user of the registered plurality of users, selection of a format using a user interaction pane of a user interface (UI) associated with the interactive platform, wherein the user interface pane of the user interface includes a categorization UI element that comprises: a geographical region wise categorization, a gender wise categorization, a race wise categorization, and an age wise categorization;
control, based on the format selected by the registered first user, the user interaction pane to display a set of topics on the user interaction pane, wherein the set of topics are related to a plurality of categories;
receive selection of one or more topics from the displayed set of topics from the registered first user via the user interaction pane, wherein the selection of the one or more topics is based on a preference of the registered first user;
provide a navigational pane on the UI, wherein the navigational pane comprises first information associated with a plurality of subjects in the plurality of categories, wherein the first information is customized for the registered first user based on at least one of a search history of the registered first user and the preference of the registered first user;

receive navigational input from the registered first user, wherein the navigational input from the registered first user is associated with engagement of the registered first user with the first information on the interactive platform, and wherein the navigational input comprises a selection of a subject of the plurality of subjects, an amount of time spent on the subject, and a preferred time of a day for accessing the first information;

process a plurality of inputs for respective topic of the set of topics received from the registered plurality of users, wherein the plurality of inputs is included in the navigational input received from each of the registered plurality of users;

provide a set of responses for at least one of the selected one or more topics, wherein the provided set of responses for the at least one of the selected one or more topics is generated based on data associated with the respective topic of the set of topics, and the plurality of processed inputs for the respective topic received from the registered plurality of users;

receive, as an input, a user response, from the registered first user, for the at least one of the selected one or more topics;

determine that information included in the received user response is one of similar or different from the provided set of responses; and add, to a database associated with the interactive platform, the information included in the user response, wherein the information is added to the database, as an additional response along with the provided set of responses for the at least one of the selected one or more topics in a case the information in the user response is different from the provided set of responses.

2. The interactive platform of claim 1, wherein to enable the registration of a specific user on the interactive platform, the at least one processor is further configured to:

receive profile information of the specific user via the UI, wherein the received profile information comprises at least a unique identification (ID) of the specific user;

verify the received profile information based on at least the unique ID of the specific user, wherein the verification is performed to ensure that the unique ID of the specific user is different from unique IDs of the registered plurality of users; and create a user profile for the specific user on the interactive platform based on the verified profile information, wherein the specific user is registered on the interactive platform based on the created user profile.

3. The interactive platform of claim 2, wherein the unique ID of the specific user comprises at least one of: a social security number, a driving license ID, a passport number, and an individual taxpayer identification (ITIN) number of the specific user.

4. The interactive platform of claim 2, wherein the received profile information further comprises biometric information of the specific user, and wherein the at least one processor is configured to verify the received profile information further based on the biometric information of the specific user.

5. The interactive platform of claim 1, wherein the at least one processor is further configured to:

receive a search query via a search UI element, wherein the search UI element is utilized by the registered first user to conduct searches associated with the plurality of categories on the interactive platform; and provide a plurality of search results corresponding to the received search query, wherein the plurality of search results comprises textual information, visual information, audio information, and audio-visual information associated with the received search query.

6. The interactive platform of claim 5, wherein the interactive platform is in communication with third-party service providers, and wherein the at least one processor is further configured to:

retrieve, from the third-party service providers, specific information of the plurality of search results corresponding to the received search query; and provide the plurality of search results based on the retrieved specific information, wherein the third-party service providers are associated with a plurality of platforms.

7. The interactive platform of claim 6, wherein the at least one processor is further configured to generate the displayed set of topics based on at least one of: second information associated with the set of topics received from the third-party service providers associated with the plurality of platforms, and the navigational input received from each of the registered plurality of users.

8. The interactive platform of claim 7, wherein the at least one processor is further configured to:

process the data associated with the respective topic of the set of topics, wherein the data is included in the second information associated with the set of topics;

process the plurality of inputs for the respective topic of the set of topics received from the registered plurality of users, wherein the plurality of inputs is included in the navigational input received from each of the registered plurality of users; and generate the provided set of responses based on the processed data associated with the respective topic, and the plurality of inputs for the respective topic of the set of topics.

9. The interactive platform of claim 8, wherein the at least one processor is configured to utilize one or more artificial intelligence (AI) models to process the data associated with the respective topic of the set of topics and the plurality of inputs for the respective topic of the set of topics.

10. The interactive platform of claim 1, wherein the at least one processor is further configured to control at least one of: the user interaction pane of the UI, and the navigational pane of the UI, based on one or more algorithms, and wherein the control comprises formatting data associated with the registered plurality of users and the plurality of categories based on a format selected by the registered first user.

11. The interactive platform of claim 1, wherein the format selected by the registered first user is further based on selection of a visual graphic from a plurality of visual graphics.

12. A method, comprising:

enabling registration of a plurality of users on an interactive platform, wherein each of the plurality of users is registered using a single user account associated with the interactive platform;

receiving, from a registered first user of the registered plurality of users, selection of a format using a user interaction pane of a user interface (UI) associated with the interactive platform, wherein the user interface pane of the user interface includes a categorization UI element that comprises: a geographical region wise categorization, a gender wise categorization, a race wise categorization, and an age wise categorization;

controlling, based on the format selected by the registered first user, the user interaction pane to display a set of topics on the user interaction pane, wherein the set of topics are related to a plurality of categories;

receiving selection of one or more topics from the set of topics from the registered first user via the user interaction pane, wherein the selection of the one or more topics is based on a preference of the registered first user;

providing a navigational pane on the UI, wherein the navigational pane comprises first information associated with a plurality of subjects in the plurality of categories, wherein the first information is customized for the registered first user based on at least one of a search history of the registered first user and the preference of the registered first user;

receiving navigational input from the registered first user, wherein the navigational input from the registered first user is associated with engagement of the registered first user with the first information on the interactive platform, and wherein the navigational input comprises a selection of a subject of the plurality of subjects, an amount of time spent on the subject, and a preferred time of a day for accessing the first information;

processing a plurality of inputs for respective topic of the set of topics received from the registered plurality of users, wherein the plurality of inputs is included in the navigational input received from each of the registered plurality of users;

providing a set of responses for at least one of the selected one or more topics, wherein the provided set of responses for the at least one of the selected one or more topics is generated based on data associated with the respective topic of the set of topics, and the plurality of processed inputs for the respective topic received from the registered plurality of users;

receiving, as an input, a user response from the registered first user, for the at least one of the selected one or more topics;

determining that information included in the received user response is one of similar or different from the provided set of responses; and adding, to a database associated with the interactive platform, the information included in the user response, wherein the information is added to the database, as an additional response along with the provided set of responses for the at least one of the selected one or more topics in a case the information in the user response is different from the provided set of responses.

13. The method of claim 12, wherein to enable the registration of a specific user on the interactive platform, the method further comprising:

receiving profile information of the specific user via the UI, wherein the received profile information comprises at least a unique identification (ID) of the specific user;

verifying the received profile information based on at least the unique ID of the specific user, wherein the verification is performed to ensure that the unique ID of the specific user is different from unique IDs of the plurality of users registered on the interactive platform; and creating a user profile for the specific user on the interactive platform based on the verified profile information, wherein the specific user is registered on the interactive platform based on the created user profile.

14. The method of claim 13, wherein the unique ID of the specific user comprises at least one of: a social security number of the specific user, a driving license ID of the specific user, and an individual taxpayer identification (ITIN) number.

15. The method of claim 14, further comprising:

receiving a search query via a search UI element, wherein the search UI element is utilized by the registered first user to conduct searches associated with the plurality of categories on the interactive platform; and providing a plurality of search results corresponding to the received search query, wherein the plurality of search results comprises textual information, visual information, audio information, and audio-visual information associated with the received search query.

16. A computer programmable product comprising a non-transitory computer readable medium having stored thereon computer executable instruction which when executed by one or more processors, cause the one or more processors to carry out operations, the operations comprising:

enabling registration of a plurality of users on an interactive platform, wherein each of the plurality of users is registered using a single user account associated with the interactive platform;

receiving, from a registered first user of the registered plurality of users, selection of a format using a user interaction pane of a user interface (UI) associated with the interactive platform, wherein the user interface pane of the user interface includes a categorization UI element that comprises: a geographical region wise categorization, a gender wise categorization, a race wise categorization, and an age wise categorization;

controlling, based on the format selected by the registered first user, the user interaction pane to display a set of topics on the user interaction pane, wherein the set of topics are related to a plurality of categories;

receiving selection of one or more topics from the set of topics from the registered first user via the user interaction pane, wherein the selection of the one or more topics is based on a preference of the registered first user;

providing a navigational pane on the UI, wherein the navigational pane comprises first information associated with a plurality of subjects in the plurality of categories, wherein the first information is customized for the registered first user based on at least one of a search history of the registered first user and the preference of the registered first user;

receiving navigational input from the registered first user, wherein the navigational input from the registered first user is associated with engagement of the registered first user with the first information on the interactive platform, and wherein the navigational input comprises a selection of a subject of the plurality of subjects, an amount of time spent on the subject, and a preferred time of a day for accessing the first information;

processing a plurality of inputs for respective topic of the set of topics received from the registered plurality of users, wherein the plurality of inputs is included in the navigational input received from each of the registered plurality of users;

providing a set of responses for at least one of the selected one or more topics, wherein the provided set of responses for the at least one of the selected one or more topics is generated based on data associated with the respective topic of the set of topics, and the plurality of processed inputs for the respective topic received from the registered plurality of users;

receiving, as an input, a user response from the registered first user, for the at least one of the selected one or more topics;

determining that information included in the received user response is one of similar or different from the provided set of responses; and adding, to a database associated with the interactive platform, the information included in the user response, wherein the information is added to the database, as an additional response along with the provided set of responses for at least one of the selected one or more topics in a case the information in the user response is different from the provided set of responses.

* * * * *